(12) United States Patent
Xu et al.

(10) Patent No.: US 11,947,622 B2
(45) Date of Patent: *Apr. 2, 2024

(54) PATTERN CHANGE DISCOVERY BETWEEN HIGH DIMENSIONAL DATA SETS

(71) Applicant: The Research Foundation for The State University of New York, Binghamton, NY (US)

(72) Inventors: Yi Xu, Endwell, NY (US); Zhongfei Mark Zhang, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 17/114,484

(22) Filed: Dec. 7, 2020

(65) Prior Publication Data
US 2021/0089612 A1    Mar. 25, 2021

Related U.S. Application Data

(63) Continuation of application No. 14/060,743, filed on Oct. 23, 2013, now Pat. No. 10,860,683.
(Continued)

(51) Int. Cl.
*G06F 17/18* (2006.01)
*G06F 18/213* (2023.01)

(52) U.S. Cl.
CPC .......... *G06F 17/18* (2013.01); *G06F 18/213* (2023.01)

(58) Field of Classification Search
CPC .............................. G06F 17/18; G06K 9/6232
(Continued)

(56) References Cited

U.S. PATENT DOCUMENTS 5,581,634 A * 12/1996 Heide ............... G06V 10/457
382/226
5,774,576 A * 6/1998 Cox .................. G06F 18/22
382/160
(Continued)

OTHER PUBLICATIONS

Tang et al. (An Iterative Strategy for Pattern Discovery in High dimensional Data Sets, 2002, CIKM, pp. 10-17 ) (Year: 2002).*
(Continued)

*Primary Examiner* — Iftekhar A Khan
(74) *Attorney, Agent, or Firm* — HOFFBERG & ASSOCIATES; Steven M. Hoffberg

(57) ABSTRACT

The general problem of pattern change discovery between high-dimensional data sets is addressed by considering the notion of the principal angles between the subspaces is introduced to measure the subspace difference between two high-dimensional data sets. Current methods either mainly focus on magnitude change detection of low-dimensional data sets or are under supervised frameworks. Principal angles bear a property to isolate subspace change from the magnitude change. To address the challenge of directly computing the principal angles, matrix factorization is used to serve as a statistical framework and develop the principle of the dominant subspace mapping to transfer the principal angle based detection to a matrix factorization problem. Matrix factorization can be naturally embedded into the likelihood ratio test based on the linear models. The method may be unsupervised and addresses the statistical significance of the pattern changes between high-dimensional data sets.

20 Claims, 12 Drawing Sheets

Related U.S. Application Data

(60) Provisional application No. 61/718,367, filed on Oct. 25, 2012.

(58) Field of Classification Search
USPC .................................................. 703/2
See application file for complete search history.

(56) References Cited

U.S. PATENT DOCUMENTS

| | | | |
|---|---|---|---|
| 5,809,499 A * | 9/1998 | Wong | G06F 16/30 706/45 |
| 5,832,182 A * | 11/1998 | Zhang | G06F 16/285 706/50 |
| 6,240,218 B1 * | 5/2001 | Michael | G06V 10/7515 382/289 |
| 6,292,797 B1 * | 9/2001 | Tuzhilin | G06F 16/2465 707/999.102 |
| 6,466,685 B1 * | 10/2002 | Fukui | G06V 40/172 382/117 |
| 6,584,413 B1 | 6/2003 | Keenan et al. | |
| 6,587,590 B1 | 7/2003 | Pan | |
| 6,640,227 B1 * | 10/2003 | Andreev | G06F 18/231 707/999.104 |
| 6,675,106 B1 | 1/2004 | Keenan et al. | |
| 6,678,413 B1 * | 1/2004 | Liang | G06T 7/20 348/169 |
| 6,687,696 B2 | 2/2004 | Hofmann et al. | |
| 6,757,343 B1 | 6/2004 | Ortega et al. | |
| 6,757,646 B2 | 6/2004 | Marchisio | |
| 6,816,743 B2 | 11/2004 | Moreno et al. | |
| 6,856,945 B2 | 2/2005 | Thomas et al. | |
| 6,906,714 B2 | 6/2005 | Grzeszczuk et al. | |
| 6,915,009 B2 | 7/2005 | Foote et al. | |
| 6,919,889 B2 | 7/2005 | Grzeszczuk et al. | |
| 6,999,074 B2 | 2/2006 | Grzeszczuk et al. | |
| 7,028,325 B1 | 4/2006 | Rui et al. | |
| 7,043,500 B2 * | 5/2006 | Leary | G16B 40/20 |
| 7,062,415 B2 | 6/2006 | Whitefield et al. | |
| 7,092,452 B2 | 8/2006 | Taylor et al. | |
| 7,103,225 B2 | 9/2006 | Yang et al. | |
| 7,137,098 B2 | 11/2006 | Whitefield et al. | |
| 7,158,983 B2 | 1/2007 | Willse et al. | |
| 7,171,339 B2 | 1/2007 | Repucci et al. | |
| 7,184,595 B2 | 2/2007 | Hel-Or et al. | |
| 7,197,485 B2 | 3/2007 | Fuller | |
| 7,218,665 B2 | 5/2007 | McElwain | |
| 7,269,598 B2 | 9/2007 | Marchisio | |
| 7,271,747 B2 | 9/2007 | Baraniuk et al. | |
| 7,328,216 B2 | 2/2008 | Hofmann et al. | |
| 7,403,894 B2 | 7/2008 | Rui et al. | |
| 7,409,321 B2 | 8/2008 | Repucci et al. | |
| 7,424,150 B2 | 9/2008 | Cooper et al. | |
| 7,430,321 B2 * | 9/2008 | Okada | G06T 7/194 382/199 |
| 7,451,173 B1 | 11/2008 | Van Benthem et al. | |
| 7,493,324 B1 * | 2/2009 | Drew | G06Q 10/0639 705/7.38 |
| 7,511,643 B2 | 3/2009 | Baraniuk et al. | |
| 7,519,200 B2 | 4/2009 | Gokturk et al. | |
| 7,561,975 B2 | 7/2009 | Young et al. | |
| 7,581,434 B1 | 9/2009 | Discenzo et al. | |
| 7,620,552 B2 | 11/2009 | Rui et al. | |
| 7,702,660 B2 | 4/2010 | Chan et al. | |
| 7,715,928 B1 | 5/2010 | Ciancio et al. | |
| 7,716,167 B2 * | 5/2010 | Colossi | G06F 16/283 707/796 |
| 7,720,644 B2 | 5/2010 | Barford | |
| 7,725,517 B1 | 5/2010 | Keenan | |
| 7,734,652 B2 | 6/2010 | Tamayo et al. | |
| 7,783,135 B2 | 8/2010 | Gokturk et al. | |
| 7,788,264 B2 | 8/2010 | Zhu et al. | |
| 7,809,192 B2 | 10/2010 | Gokturk et al. | |
| 7,809,722 B2 | 10/2010 | Gokturk et al. | |
| 7,831,538 B2 | 11/2010 | Chi et al. | |
| 7,840,626 B1 | 11/2010 | Keenan | |
| 7,844,646 B1 * | 11/2010 | Deshmukh | G06F 16/10 707/827 |
| 7,870,083 B2 | 1/2011 | Zhu et al. | |
| 7,873,127 B2 | 1/2011 | Francis | |
| 7,885,819 B2 | 2/2011 | Koishida et al. | |
| 7,890,842 B2 | 2/2011 | Candes et al. | |
| 7,912,140 B2 | 3/2011 | Anholt et al. | |
| 7,917,540 B2 * | 3/2011 | Kirby | G06F 18/21375 382/181 |
| 7,949,186 B2 * | 5/2011 | Grauman | G06V 10/764 382/168 |
| 8,032,209 B2 | 10/2011 | He et al. | |
| 8,046,214 B2 | 10/2011 | Mehotra et al. | |
| 8,064,662 B2 | 11/2011 | Bi | |
| 8,073,963 B1 * | 12/2011 | Wechsler | G06V 10/764 709/231 |
| 8,116,566 B2 | 2/2012 | Kirby et al. | |
| 8,139,900 B2 | 3/2012 | Gokturk et al. | |
| 8,185,481 B2 | 5/2012 | Long | |
| 8,195,730 B2 | 6/2012 | Geiger et al. | |
| 8,204,842 B1 | 6/2012 | Zhang et al. | |
| 8,211,634 B2 | 7/2012 | DePinho et al. | |
| 8,218,880 B2 | 7/2012 | Zhao et al. | |
| 8,255,229 B2 | 8/2012 | Koishida et al. | |
| 8,265,778 B2 | 9/2012 | Taylor et al. | |
| 8,266,197 B1 | 9/2012 | Van Benthem et al. | |
| 8,275,384 B2 | 9/2012 | Das et al. | |
| 8,285,719 B1 | 10/2012 | Long | |
| 8,290,961 B2 | 10/2012 | Chew et al. | |
| 8,315,442 B2 | 11/2012 | Gokturk et al. | |
| 8,321,147 B2 | 11/2012 | Bink et al. | |
| 8,345,982 B2 | 1/2013 | Gokturk et al. | |
| 8,346,692 B2 | 1/2013 | Rouat et al. | |
| 8,406,525 B2 | 3/2013 | Ma et al. | |
| 8,417,650 B2 | 4/2013 | Graepel et al. | |
| 8,443,080 B2 | 5/2013 | Ding et al. | |
| 8,458,115 B2 | 6/2013 | Cai et al. | |
| 8,542,781 B2 | 9/2013 | Wang et al. | |
| 8,577,653 B2 | 11/2013 | Ikeda | |
| 8,583,586 B2 | 11/2013 | Ebadollahi et al. | |
| 8,630,513 B2 | 1/2014 | Gokturk et al. | |
| 8,630,975 B1 | 1/2014 | Guo et al. | |
| 8,645,146 B2 | 2/2014 | Koishida et al. | |
| 8,649,572 B2 | 2/2014 | Gokturk et al. | |
| 8,654,742 B2 | 2/2014 | Freear et al. | |
| 8,676,805 B1 | 3/2014 | Long | |
| 8,682,824 B2 | 3/2014 | Shibuya et al. | |
| 8,700,544 B2 | 4/2014 | Sontag et al. | |
| 8,700,547 B2 | 4/2014 | Long et al. | |
| 8,712,862 B2 | 4/2014 | Gokturk et al. | |
| 8,719,198 B2 | 5/2014 | Zheng et al. | |
| 8,719,257 B2 | 5/2014 | Rangan et al. | |
| 8,732,025 B2 | 5/2014 | Gokturk et al. | |
| 8,732,030 B2 | 5/2014 | Gokturk et al. | |
| 8,822,153 B2 | 9/2014 | Hayes et al. | |
| 8,831,754 B2 | 9/2014 | Taylor et al. | |
| 8,867,806 B2 | 10/2014 | Hibbard | |
| 8,877,445 B2 | 11/2014 | Shackney | |
| 8,880,439 B2 | 11/2014 | Archambeau et al. | |
| 8,897,505 B2 | 11/2014 | Gokturk et al. | |
| 8,902,423 B2 | 12/2014 | Myrick et al. | |
| 8,913,121 B2 | 12/2014 | Gesley | |
| 8,924,230 B2 | 12/2014 | Oakley et al. | |
| 8,930,212 B2 | 1/2015 | Oakley et al. | |
| 8,930,304 B2 | 1/2015 | Guo et al. | |
| 8,935,308 B2 | 1/2015 | Porikli et al. | |
| 8,948,488 B2 | 2/2015 | Can et al. | |
| 8,954,425 B2 | 2/2015 | Xiao et al. | |
| 8,966,277 B2 | 2/2015 | Rane et al. | |
| 8,996,350 B1 | 3/2015 | Dub et al. | |
| 8,996,528 B1 | 3/2015 | Long | |
| 9,008,202 B2 | 4/2015 | Vetterli et al. | |
| 9,008,435 B2 | 4/2015 | Gokturk et al. | |
| 9,026,452 B2 | 5/2015 | Koishida et al. | |
| 9,060,113 B2 | 6/2015 | Rhoads et al. | |
| 9,082,162 B2 | 7/2015 | Gokturk et al. | |
| 9,092,850 B2 | 7/2015 | Murphy et al. | |
| 9,093,056 B2 | 7/2015 | Pardo et al. | |

(56) References Cited

U.S. PATENT DOCUMENTS

| | | |
|---|---|---|
| 9,110,461 B2 | 8/2015 | Morisawa et al. |
| 9,147,245 B1 | 9/2015 | Ghouti |
| 9,171,013 B2 | 10/2015 | Gokturk et al. |
| 9,191,831 B2 | 11/2015 | Giannakis et al. |
| 9,202,178 B2 | 12/2015 | Hall et al. |
| 9,207,237 B2 | 12/2015 | Cohen et al. |
| 9,269,051 B2 | 2/2016 | Guo et al. |
| 9,309,564 B2 | 4/2016 | DePinho et al. |
| 9,311,897 B2 | 4/2016 | Subramanian et al. |
| 9,317,786 B2 | 4/2016 | DePinho et al. |
| 9,326,698 B2 | 5/2016 | Blanco et al. |
| 9,330,332 B2 | 5/2016 | Natarajan et al. |
| 9,336,315 B2 | 5/2016 | Ovsjanikovs et al. |
| 9,349,376 B2 | 5/2016 | Koishida et al. |
| 9,355,167 B2 | 5/2016 | Gomes et al. |
| 9,367,819 B2 | 6/2016 | Nicholson et al. |
| 9,367,958 B2 | 6/2016 | Hibbard |
| 9,384,272 B2 | 7/2016 | Bertin-Mahieux et al. |
| 9,420,368 B2 | 8/2016 | Stein et al. |
| 9,424,337 B2 | 8/2016 | Hall et al. |
| 9,430,719 B2 | 8/2016 | Gokturk et al. |
| 9,430,842 B1 | 8/2016 | Hayat et al. |
| 9,495,617 B2 | 11/2016 | Sandler et al. |
| 9,507,913 B2 | 11/2016 | Mansi et al. |
| 9,518,103 B2 | 12/2016 | Cohen et al. |
| 9,519,826 B2 | 12/2016 | Sandler et al. |
| 9,519,966 B2 | 12/2016 | Ghouti et al. |
| 9,576,023 B2 | 2/2017 | Franceschini et al. |
| 9,589,357 B2 | 3/2017 | Li et al. |
| 9,589,565 B2 | 3/2017 | Boies et al. |
| 9,593,982 B2 | 3/2017 | Rhodes et al. |
| 9,594,075 B2 | 3/2017 | Eggan et al. |
| 9,594,946 B2 | 3/2017 | Sandler et al. |
| 9,600,568 B2 | 3/2017 | Rangan |
| 9,600,775 B2 | 3/2017 | Coles et al. |
| 9,607,014 B2 | 3/2017 | Wang et al. |
| 9,607,374 B2 | 3/2017 | Azar et al. |
| 2001/0047137 A1 | 11/2001 | Moreno et al. |
| 2002/0039446 A1* | 4/2002 | Santoni ............... G06F 18/21 382/209 |
| 2002/0080347 A1* | 6/2002 | Yoda ............... G01N 21/956 356/237.2 |
| 2002/0156763 A1 | 10/2002 | Marchisio |
| 2003/0048946 A1 | 3/2003 | Foote et al. |
| 2003/0144947 A1 | 7/2003 | Payne |
| 2003/0172043 A1* | 9/2003 | Guyon ............... G16B 40/20 706/48 |
| 2003/0198305 A1 | 10/2003 | Taylor et al. |
| 2003/0234783 A1 | 12/2003 | Grzeszczuk et al. |
| 2003/0234784 A1 | 12/2003 | Grzeszczuk et al. |
| 2004/0030534 A1 | 2/2004 | Thomas et al. |
| 2004/0059736 A1 | 3/2004 | Willse et al. |
| 2004/0103108 A1* | 5/2004 | Andreev ............... G06F 16/285 706/50 |
| 2004/0126016 A1 | 7/2004 | Hel-Or et al. |
| 2004/0213360 A1 | 10/2004 | McElwain |
| 2005/0015205 A1 | 1/2005 | Repucci et al. |
| 2005/0021517 A1 | 1/2005 | Marchisio |
| 2005/0021528 A1* | 1/2005 | Andreev ............... G06F 16/285 |
| 2005/0060295 A1 | 3/2005 | Gould et al. |
| 2005/0123053 A1 | 6/2005 | Cooper et al. |
| 2005/0234686 A1 | 10/2005 | Cheng et al. |
| 2005/0246354 A1 | 11/2005 | Tamayo et al. |
| 2005/0278703 A1 | 12/2005 | Lo et al. |
| 2006/0020866 A1 | 1/2006 | Lo et al. |
| 2006/0020923 A1 | 1/2006 | Lo et al. |
| 2006/0020924 A1 | 1/2006 | Lo et al. |
| 2006/0045353 A1* | 3/2006 | Brand ............... G06F 18/213 382/168 |
| 2006/0047485 A1 | 3/2006 | Whitefield et al. |
| 2006/0059452 A1 | 3/2006 | Whitefield et al. |
| 2006/0251292 A1 | 11/2006 | Gokturk et al. |
| 2006/0251303 A1 | 11/2006 | He et al. |
| 2006/0251338 A1 | 11/2006 | Gokturk et al. |
| 2006/0251339 A1 | 11/2006 | Gokturk et al. |
| 2006/0253491 A1 | 11/2006 | Gokturk et al. |
| 2006/0282178 A1 | 12/2006 | Das et al. |
| 2007/0005391 A1 | 1/2007 | Repucci et al. |
| 2007/0016837 A1 | 1/2007 | Candes et al. |
| 2007/0027656 A1 | 2/2007 | Baraniuk et al. |
| 2007/0067167 A1 | 3/2007 | Barford |
| 2007/0067378 A1 | 3/2007 | Barford |
| 2007/0217676 A1 | 9/2007 | Grauman et al. |
| 2008/0012855 A1 | 1/2008 | Bi |
| 2008/0015871 A1 | 1/2008 | Eder |
| 2008/0069437 A1* | 3/2008 | Baker ............... G06F 18/214 382/159 |
| 2008/0075722 A1 | 3/2008 | DePinho et al. |
| 2008/0109454 A1 | 5/2008 | Willse et al. |
| 2008/0123900 A1 | 5/2008 | Ma et al. |
| 2008/0129560 A1 | 6/2008 | Baraniuk et al. |
| 2008/0175446 A1* | 7/2008 | Kirby ............... G06F 18/21375 382/118 |
| 2008/0240277 A1 | 10/2008 | Anholt et al. |
| 2008/0256130 A1* | 10/2008 | Kirby ............... G06F 18/21375 |
| 2008/0287164 A1 | 11/2008 | Francis |
| 2008/0294686 A1* | 11/2008 | Long ............... G06F 16/285 707/E17.046 |
| 2008/0319739 A1 | 12/2008 | Mehrotra et al. |
| 2009/0001262 A1 | 1/2009 | Visser et al. |
| 2009/0006103 A1 | 1/2009 | Koishida et al. |
| 2009/0018891 A1 | 1/2009 | Eder |
| 2009/0099984 A1 | 4/2009 | Zhu et al. |
| 2009/0196510 A1 | 8/2009 | Gokturk et al. |
| 2010/0002797 A1 | 1/2010 | Sanayei |
| 2010/0095394 A1 | 4/2010 | Bink et al. |
| 2010/0138377 A1* | 6/2010 | Wright ............... G06N 5/01 706/52 |
| 2010/0233695 A1 | 9/2010 | Hayes et al. |
| 2010/0257117 A1 | 10/2010 | Shvadron et al. |
| 2011/0004631 A1* | 1/2011 | Inokuchi ............... G06F 16/9024 707/798 |
| 2011/0015942 A1 | 1/2011 | Oakley et al. |
| 2011/0026853 A1 | 2/2011 | Gokturk et al. |
| 2011/0064302 A1 | 3/2011 | Ma et al. |
| 2011/0082671 A1 | 4/2011 | Graning |
| 2011/0086349 A1 | 4/2011 | Anjomshoaa et al. |
| 2011/0099026 A1 | 4/2011 | Oakley et al. |
| 2011/0179327 A1* | 7/2011 | Candes ............... H03M 13/6561 714/E11.023 |
| 2011/0184778 A1 | 7/2011 | Graepel et al. |
| 2011/0196684 A1 | 8/2011 | Koishida et al. |
| 2011/0213655 A1 | 9/2011 | Henkin et al. |
| 2011/0230229 A1 | 9/2011 | Das et al. |
| 2011/0235729 A1 | 9/2011 | Freear et al. |
| 2011/0236903 A1 | 9/2011 | McClelland et al. |
| 2011/0246409 A1* | 10/2011 | Mitra ............... G06F 17/18 702/179 |
| 2011/0276565 A1 | 11/2011 | Zheng et al. |
| 2011/0276682 A1 | 11/2011 | Ding et al. |
| 2011/0313548 A1 | 12/2011 | Taylor et al. |
| 2012/0028907 A1 | 2/2012 | Shackney |
| 2012/0041769 A1 | 2/2012 | Dalal et al. |
| 2012/0051467 A1 | 3/2012 | Wang et al. |
| 2012/0069170 A1 | 3/2012 | Gesley |
| 2012/0150500 A1 | 6/2012 | Ikeda |
| 2012/0173732 A1 | 7/2012 | Sullivan |
| 2012/0209847 A1 | 8/2012 | Rangan |
| 2012/0226723 A1* | 9/2012 | Zhang ............... G06F 17/18 708/203 |
| 2012/0290505 A1 | 11/2012 | Eder |
| 2012/0290879 A1 | 11/2012 | Shibuya et al. |
| 2012/0296891 A1 | 11/2012 | Rangan |
| 2012/0296907 A1 | 11/2012 | Long |
| 2012/0303504 A1 | 11/2012 | Eder |
| 2012/0304125 A1 | 11/2012 | Gokturk et al. |
| 2012/0323584 A1 | 12/2012 | Koishida et al. |
| 2012/0323828 A1 | 12/2012 | Sontag et al. |
| 2013/0006900 A1 | 1/2013 | Taylor et al. |
| 2013/0034276 A1 | 2/2013 | Hibbard |
| 2013/0064379 A1 | 3/2013 | Pardo et al. |
| 2013/0072392 A1 | 3/2013 | DePinho et al. |

(56) References Cited

U.S. PATENT DOCUMENTS

| | | | |
|---|---|---|---|
| 2013/0073221 A1 | 3/2013 | Attinger et al. | |
| 2013/0117878 A1 | 5/2013 | Bink et al. | |
| 2013/0121589 A1 | 5/2013 | Gokturk et al. | |
| 2013/0162999 A1 | 6/2013 | Myrick et al. | |
| 2013/0173042 A1 | 7/2013 | Morisawa et al. | |
| 2013/0191425 A1 | 7/2013 | Porikli et al. | |
| 2013/0226839 A1 | 8/2013 | Archambeau et al. | |
| 2013/0226850 A1 | 8/2013 | Hannuksela et al. | |
| 2013/0243046 A1 | 9/2013 | Vetterli et al. | |
| 2013/0331281 A1 | 12/2013 | Tsai et al. | |
| 2013/0336091 A1* | 12/2013 | Song | G01V 1/288 367/38 |
| 2014/0011861 A1 | 1/2014 | McClelland et al. | |
| 2014/0039834 A1 | 2/2014 | Shibuya et al. | |
| 2014/0099033 A1 | 4/2014 | Natarajan et al. | |
| 2014/0114636 A1 | 4/2014 | Daloukas et al. | |
| 2014/0121985 A1 | 5/2014 | Sayood et al. | |
| 2014/0122039 A1* | 5/2014 | Xu | G06F 18/213 703/2 |
| 2014/0156287 A1 | 6/2014 | Koishida et al. | |
| 2014/0181171 A1 | 6/2014 | Dourbal | |
| 2014/0188780 A1 | 7/2014 | Guo et al. | |
| 2014/0195184 A1 | 7/2014 | Maeda et al. | |
| 2014/0272914 A1 | 9/2014 | Baraniuk et al. | |
| 2014/0279727 A1 | 9/2014 | Baraniuk et al. | |
| 2014/0279795 A1 | 9/2014 | Shibuya et al. | |
| 2014/0281567 A1 | 9/2014 | Rane et al. | |
| 2014/0295413 A1 | 10/2014 | Cohen et al. | |
| 2014/0314301 A1 | 10/2014 | Azar et al. | |
| 2014/0329274 A1 | 11/2014 | Bowen et al. | |
| 2014/0369626 A1 | 12/2014 | Gokturk et al. | |
| 2015/0024399 A1 | 1/2015 | Hayes et al. | |
| 2015/0036901 A1 | 2/2015 | Hibbard | |
| 2015/0052003 A1 | 2/2015 | Tang et al. | |
| 2015/0086038 A1 | 3/2015 | Stein et al. | |
| 2015/0089524 A1 | 3/2015 | Cremonesi et al. | |
| 2015/0112812 A1 | 4/2015 | Weinsberg et al. | |
| 2015/0120760 A1 | 4/2015 | Wang et al. | |
| 2015/0127454 A1 | 5/2015 | Penzotti et al. | |
| 2015/0127455 A1 | 5/2015 | Penzotti et al. | |
| 2015/0170536 A1 | 6/2015 | Lan et al. | |
| 2015/0178631 A1 | 6/2015 | Thomas et al. | |
| 2015/0186789 A1 | 7/2015 | Guo et al. | |
| 2015/0191793 A1 | 7/2015 | Tsai et al. | |
| 2015/0206060 A1 | 7/2015 | Coles et al. | |
| 2015/0213604 A1 | 7/2015 | Li et al. | |
| 2015/0213804 A1 | 7/2015 | Koishida et al. | |
| 2015/0216413 A1 | 8/2015 | Soyao et al. | |
| 2015/0226058 A1 | 8/2015 | Stolpman | |
| 2015/0234053 A1 | 8/2015 | Psiaki et al. | |
| 2015/0278441 A1 | 10/2015 | Min et al. | |
| 2015/0290207 A1 | 10/2015 | Kutok et al. | |
| 2015/0301028 A1 | 10/2015 | Eggan et al. | |
| 2015/0301029 A1 | 10/2015 | Eggan et al. | |
| 2015/0301030 A1 | 10/2015 | Eggan et al. | |
| 2015/0324631 A1 | 11/2015 | Sandler et al. | |
| 2015/0354009 A1 | 12/2015 | Sadanandam et al. | |
| 2015/0374237 A1 | 12/2015 | Hu et al. | |
| 2016/0012044 A1 | 1/2016 | Franceschini et al. | |
| 2016/0012045 A1 | 1/2016 | Franceschini et al. | |
| 2016/0012054 A1 | 1/2016 | Franceschini et al. | |
| 2016/0012057 A1 | 1/2016 | Franceschini et al. | |
| 2016/0012058 A1 | 1/2016 | Franceschini et al. | |
| 2016/0012092 A1 | 1/2016 | Franceschini et al. | |
| 2016/0012106 A1 | 1/2016 | Franceschini et al. | |
| 2016/0012119 A1 | 1/2016 | Franceschini et al. | |
| 2016/0012122 A1 | 1/2016 | Franceschini et al. | |
| 2016/0012125 A1 | 1/2016 | Franceschini et al. | |
| 2016/0012126 A1 | 1/2016 | Franceschini et al. | |
| 2016/0012316 A1 | 1/2016 | Ghouti | |
| 2016/0012336 A1 | 1/2016 | Franceschini et al. | |
| 2016/0013773 A1 | 1/2016 | Dourbal | |
| 2016/0040236 A1 | 2/2016 | Hosur et al. | |
| 2016/0055369 A1 | 2/2016 | Sandler et al. | |
| 2016/0060704 A1 | 3/2016 | Davulur et al. | |
| 2016/0069876 A1 | 3/2016 | Cohen et al. | |
| 2016/0071526 A1 | 3/2016 | Wingate et al. | |
| 2016/0073198 A1 | 3/2016 | Vilermo et al. | |
| 2016/0090638 A1 | 3/2016 | Tsai et al. | |
| 2016/0093033 A1 | 3/2016 | Allano et al. | |
| 2016/0098840 A1 | 4/2016 | Allano et al. | |
| 2016/0099787 A1 | 4/2016 | Jackson | |
| 2016/0117285 A1 | 4/2016 | Boutsidis et al. | |
| 2016/0125270 A1 | 5/2016 | Gokturk et al. | |
| 2016/0171228 A1 | 6/2016 | Bhagat et al. | |
| 2016/0171391 A1 | 6/2016 | Guo et al. | |
| 2016/0171398 A1 | 6/2016 | Eder | |
| 2016/0178439 A1 | 6/2016 | Freudiger et al. | |
| 2016/0188792 A1 | 6/2016 | Zwir et al. | |
| 2016/0232281 A1 | 8/2016 | Min et al. | |
| 2016/0239084 A1 | 8/2016 | Connor | |
| 2016/0239611 A1 | 8/2016 | Heldt et al. | |
| 2016/0239969 A1 | 8/2016 | Davatzikos et al. | |
| 2016/0247515 A1 | 8/2016 | Koishida et al. | |
| 2016/0282327 A1 | 9/2016 | Eggan et al. | |
| 2016/0314579 A1 | 10/2016 | Ghouti et al. | |
| 2016/0328508 A1 | 11/2016 | Daloukas et al. | |
| 2016/0328654 A1 | 11/2016 | Bauer et al. | |
| 2016/0372128 A1 | 12/2016 | Baeckstroem et al. | |
| 2016/0379309 A1 | 12/2016 | Shikhare | |
| 2017/0011256 A1 | 1/2017 | Sandler et al. | |
| 2017/0011280 A1 | 1/2017 | Soldevila et al. | |
| 2017/0023482 A1 | 1/2017 | Cicerone et al. | |
| 2017/0053185 A1 | 2/2017 | Sandler et al. | |
| 2017/0061817 A1 | 3/2017 | Mettler May | |
| 2017/0071496 A1 | 3/2017 | Gillies et al. | |
| 2017/0088900 A1 | 3/2017 | Anjamshoaa et al. | |
| 2017/0103194 A1 | 4/2017 | Wechsler | |
| 2018/0284758 A1* | 10/2018 | Cella | G06N 3/084 |
| 2019/0041835 A1* | 2/2019 | Cella | G05B 23/024 |

OTHER PUBLICATIONS

Koyuturk, et al. (Compression, Clustering and Pattern Discovery in Very High Dimensional Discrete-Attribute Datasets, 2003, pp. 1-15) (Year: 2003).*

* cited by examiner

November 7th

November 13th

November 19th

PATTERN CHANGE DISCOVERY BETWEEN HIGH DIMENSIONAL DATA SETS

CROSS REFERENCE TO RELATED APPLICATION

The present application is Continuation of U.S. patent application Ser. No. 14/060,743, filed Oct. 23, 2013, now U.S. Pat. No. 10,860,683, issued Dec. 8, 2020, which is a non-provisional of, and claims benefit of priority under 35 U.S.C. § 119(e) from U.S. Provisional Patent Application Ser. No. 61/718,367, filed Oct. 25, 2012, the entirety of which are expressly incorporated herein by reference in their entirety.

STATEMENT OF GOVERNMENT SUPPORT

This invention was made with Government support under IIS-0535162, IIS-0812114, IIS-0905215, and CCF-1017828 awarded by the National Science Foundation. The Government has certain rights in this invention.

1. BACKGROUND OF THE INVENTION

High dimensional data exist everywhere in our life and in all the sectors of our society in every modality of the data we live with today, including text, imagery, audio, video, and graphics. Pattern change discovery from high dimensional data sets is a general problem that arises in almost every application in the real-world; examples of such applications include concept drift mining in text data, event discovery in surveillance video data, event discovery in news data, hot topic discovery in the literature, image pattern change detection, as well as genome sequence change detection in bioinformatics, to just name a few.

In each of the above applications, we formulate the problem as follows. Given two typically high-dimensional data sets, we intend to determine whether there is a significant pattern change between the two data sets. In different applications, the physical interpretation of the two data sets may be different. For example, in detecting any topic change between two text documents, the two high-dimensional data sets may be the two text documents; in detecting any concept drift among a text stream, any pair of two neighboring snapshots of the text collections in the timeline may be considered as the two high-dimensional data sets; in detecting any pattern change between two images or two collections of images, the two high dimensional data sets may be the two corresponding images or the two collections of the images; in detecting any event occurred in a surveillance video camera, the two high-dimensional data sets may be any pair of two neighboring video frames or groups of video frames in the video stream; in detecting any hot topics in a news data stream, the two high-dimensional data sets may be two neighboring sample windows of the news text data within the stream.

One may wonder what makes high-dimensional data different when it comes to change detection. For almost all the magnitude change detection methods, an invisible pitfall arises with the increase of data's dimensionality. The tricky conflict between Euclidean distance and dimensionality is illustrated in FIG. 1. Here we use Euclidean distance because it is the most intuitive and popular metric. Moreover, many commonly used metrics, such as L-norms, K-L divergence, or more generally, Bregman divergence, are defined based on the Euclidean distance. FIG. 1 gives two pairs of vectors $(v_1, v_2)$ and $(v'_1, v'_2)$, and the angles, $\theta$, $\theta'$ between each pair, respectively. Under Euclidean distance, $\|v_1-v_2\|$, and $\|v'_1-v'_2\|$ are the same. In other words, Euclidean distance fails to detect $\theta \neq \theta'$, and therefore, is unable to differentiate the length difference from the direction difference introduced by the dimensionality.

In fact, in quite a few real-world applications, high dimensional data per se do not contribute to the data vectors' magnitude change, but to a new combination of a certain subset of the features. For example, we do not intend to conclude that the difference between a human baby and an adult is the same as that between the baby and a little monkey; a banker is not interested in the volume of the financial news but the newly emerged key words; to examine the mutation of a DNA sequence, a biologist needs to find the new combination of Adenine and Guanine instead of the DNA data size change. In these cases, the change of feature subspace should not be confused with the change of data's magnitude. One may argue that we still could round up all the vectors into the same length and then apply the Euclidean distance to avoid the confusion with the magnitude. Such a manipulation theoretically works only when the subspace dimension spanned by data is one (to compare only two vectors). Moreover, the round-up errors and the change of the original data structure may lead to unmanageable consequences.

Based on the above fact, our first motivation is to find a metric that is invariant under the data's magnitude change and only characterize the subspace change introduced by dimensionality. Further, we require that such a metric is in a form suitable for computation and manipulation. Thus, while detection of data's magnitude change may be significant, other measures may also be significant.

The classic paradigm for magnitude-based change detection between two data sets is through parameter estimations based on established distribution models. More recent work in this direction [25, 12, 27] attempts to avoid the parametric dependency and to define alternative distance measures between the two distributions. In [25], Song et al. developed a Monte-Carlo framework to detect distribution changes for low dimensional data. In [12], Kifer et al. defined the Adistance to measure the non-parametric distribution change. In [27], Leeuwen and Siebes described the data distributions using their compressed code table and defined the Code-Table-Difference to capture the distribution difference between data sets. The limitation of the low-dimensional distribution models, as Vapnik pointed out at the beginning of his book [28], is that they do not reflect the singularities of the high-dimensional cases, and consequently cannot grasp the change of the subspace.

Based on Vapnik's statistic supervised learning theory, the pattern change detection problem, also called concept drift in several specific applications, has been attracted great effort [26, 31, 30, 29, 21]. Classifiers are trained to capture the subspace structures of the high-dimensional data sets via support vectors. The pattern changes can be indirectly reflected through evaluating the classification errors on the data sets. Tsymbal [26] provides an overview of the important literature on this topic. The main categories of the methods to address the concept drift analysis problem include the instance selection and weighting [13, 11], the ensemble learning [30, 31, 2], and the two-samples hypothesis test [5, 10, 21]. Although supervised learning techniques have the capacity to detect structural changes between high-dimensional data sets, they require labels to train and validate the classifiers. Most of the real-world data sets, however, typically lack sufficient labels that can be used to train the classifiers. In [5], Dries and Rückert proposed a trade-off strategy. Without using real labels, they constructed two virtual classifiers by giving two different types of the labels to the two data sets, respectively, and then proposed three two-sample test methods based on the quality of the classifiers; a good quality indicates a concept drift between the two data sets. Using one classifier to describe the whole dataset, however, oversimplifies the mixture structures of the data sets, and the detection performance is expected to be impaired (see Sec. 5).

As an unsupervised paradigm, matrix factorization is recently considered for subspace analysis of high-dimensional data sets. The theory and applications of matrix factorization have been intensively developed during the last decade. In [16], Lee and Seung developed the breakthrough of the multiplicative updating rules for solving matrix factorization, extending the classical vector quantization and principal components analysis to a new horizon. In [8], Gordon unified the matrix factorization literature with the generalized linear models, strengthening the statistical foundation for matrix factorization. As for the applications, Ding et al. [4] applied non-negative matrix factorization to spectral clustering, graph matching, and clique finding. Long et al. [19, 18] used matrix factorization for relational clustering. Miettinen [20] developed factorization algorithms for binary data sets. In this paper, we use matrix factorization and the notion of the principal angles between subspaces to capture the structural difference between the high-dimensional data sets.

Other recent efforts on the magnitude-based change detection for specific applications include the event detection from time series data [15, 22] focusing on discovering a significant magnitude change and its duration on a particular feature, word bursts tracking [6, 9], and trend analysis in blogosphere by tracking singular values [3].

See, U.S. Pat. Nos. 8,116,566; 8,032,209; 7,949,186; 7,917,540; 7,890,842; 6,240,218, 2011/0179327; 2010/0002797; 2008/0256130; 2008/0175446; 2008/0123900; 2007/0217676; 2007/0016837; 2006/0251303; 2006/0020924; 2006/0020923; 2006/0020866; and 2005/0278703, each of which is expressly incorporated herein by reference in its entirety.

2. SUMMARY OF THE INVENTION

The general problem of pattern change discovery between high-dimensional data sets is an interesting one. Current methods either mainly focus on magnitude change detection of low-dimensional data sets or are under supervised frameworks. The notion of the principal angles between the subspaces is introduced according to aspects of the present technology to measure the subspace difference between two high-dimensional data sets. Principal angles bear a property to isolate subspace change from the magnitude change. That is, the principal angles are invariant under magnitude change. To address the challenge of directly computing the principal angles, matrix factorization may be used to serve as a statistical framework and develop the principle of the dominant subspace mapping to transfer the principal angle based detection to a matrix factorization problem. Matrix factorization can be naturally embedded into the likelihood ratio test based on the linear models. The proposed method is of an unsupervised nature and addresses the statistical significance of the pattern changes between high-dimensional data sets. Different applications of this solution have various specific real-world applications, demonstrating the power and effectiveness of this method.

Detection of the subspace change between high-dimensional data sets solely through a magnitude-based metric is inaccurate and conceptually confusing. As discussed below, pattern change between high-dimensional data sets is employed to mean the subspace change, not the magnitude change.

In order to identify the appropriate subspace for discovering the pattern change between the data sets, the concept of dominant subspace based on the principal angles [7] is introduced. The notion of principal angels between two subspace has an advantageous property of invariance under an isomorphism, thus is independent of data's magnitude change. The challenge then is to compute the principal angles. To address this challenge, matrix factorization is used to serve as a statistical framework for computing the principal angles. The principle of dominant subspace mapping is used to show how matrix factorization can be naturally embedded into the likelihood ratio test based on the principle. The proposed method is of an unsupervised nature and addresses the statistical significance of the pattern changes between represented in the linear models.

The statistical significance of the difference is preferably addressed according to the present technology through a likelihood hypothesis test based on the linear model. This provides a technique which employs matrix factorization to develop a statistical framework for the pattern change detection.

The choice of the threshold value h in the likelihood ratio test depends on the characteristics of the specific application. In many cases, ranking can be applied instead of thresholding. More specifically, when detecting an event from the news streams and video streams, one can rank the likelihood ratio sequence A in a descent order; the top-ranked data segments correspond to the most significant pattern changes in the given data streams (See FIGS. 3 and 5-7).

In cases when a threshold is necessary, choosing an appropriate threshold value depends upon the potential follow-up actions based on the detection results, and usually is formulated as a decision making problem [152]. In general, a threshold is determined by the relative consequences of different actions representing one of the four possible scenarios: true positive, true negative, false positive, and false negative [153]. An overall assessment of the cost associated with any of the four consequences in a specific application needs to be conducted before we are able to give an appropriate threshold value. For example, if the specific application is the earthquake detection in a densely populated area, a few false positives are allowed but no false negatives are acceptable. Utility functions needs to be evaluated from the four possible outcomes; a threshold comes as a trade-off among the utilities of the four outcomes. Determining the utility function is application specific, depending possibly on the budget, and the cost of the hazard, etc.

For time evolving data streams, self-adaptive algorithms can be further applied. There is abundant literature on this topic (See [154][155][156][157]). This technology can be applied to many important areas. For example, in financial applications, if we consider the customer daily transactional data as the time-series data, we may apply this invention to detect any abnormal transactional patterns that may indicate potential crimes such as money laundering. When the invention is used to daily sales data on the other hand, we are able to identify new customer interests. As yet another example, if we consider the daily online transactional data, we may be able to use this technology to discover new business models.

The present technology may be applied to large data sets of various types, for example, video, audio, semantic, financial data (e.g., markets, transactions), social networks and data feeds, and the like. In general, an advantage of various embodiments according to the present technology is that a segmentation, parsing, clustering or other significant preprocessing of the data is not required. Likewise, an actual understanding or modeling of the data content is not required. Certainly, processing the data using such techniques may eliminate noise or otherwise accentuate features of interest, and thus facilitate the underlying process. However, the extraction of principal angles, similar to the extraction of principal components, may be applied to data sets which are relatively raw, and the statistical processes themselves extract the distinguishing features. Likewise, in a preferred embodiment, the technology is used to determine existence of a significant pattern change, without directly addressing what features are most significant in that determination. For example, one might seek to monitor equity market data and news data feeds in real time to determine whether a significant change in market trajectory is about to occur. In that case, the models to be compared are a high dimensional model of historical performance of equity markets with respect to news feeds, and a model of current market conditions with a relatively short tail. The system then seeks to determine the set of principal angles of the dominant subspace representing differences between the respective linear models using matrix factorization. This is may be conducted with a massively parallel processor system, such as the IBM Netezza Puredata System for Analytics N1001-010 (on one or multiple racks). A statistical test is established to qualify the statistical significance of differences, based on a set of basis vectors. The threshold for a determination of significance may be manually set, or static or adaptive dependent on the model of the data itself. In this case, there is no "intelligence" applied to identify an event or object which particularly contributes to a determination of the significance of changes, but rather a statistical process.

The decision threshold may be adaptive to type 1 (false positive) errors, type 2 (false negative) errors, a relationship between type 1 and type 2 errors, or other factors, which may be intrinsic or extrinsic to the data sets.

Another example of the use of this technology is a collaborative filter. In such a filter, affinity groups of people with common interest are created to predict future preferences for other group members.

The underlying assumption of the collaborative filtering approach is that if a person A has the same opinion as a person B on an issue, A is more likely to have B's opinion on a different issue x than to have the opinion on x of a person chosen randomly. Note that these predictions are specific to the user, but use information gleaned from many users. See en.wikipedia.org/wiki/Collaborative_filtering, expressly incorporated herein by reference. Some collaborative filters rely on principal component analysis. However, this technique relies on time invariance. That is, old data is used to predict future preferences, without considering the time lapse effects on user preferences. Therefore, the present technology may be used on all or selected portions of the data set to determine significant changes over time; when those changes occur, reliance on the past data is suspect, and therefore an alternate approach adopted. For example, a statistically similar subpopulation may be selected for use in the collaborative filter. Likewise, suspect data for users may be removed from an updated model, to the point necessary to avoid significant pattern changes. Therefore, the magnitude and angle of differences between datasets, represented by the principal components and the principal angles, may both be employed. According to the preferred embodiment, the principal angles are produced using a matrix factorization of the linear model of the dominant subspace, which are then statistically tested.

In some cases, a further analysis of the principal angles may be employed alternately or in addition to the statistical significance analysis.

It is therefore an object of the technology to introduce the notion of principal angles between subspaces as a metric for pattern change.

It is another object of the technology to employ the principle of the dominant subspace mapping to transfer the principal angle based detection to a matrix factorization problem.

It is a still further object to employ the different applications of this solution in several specific real-world applications to demonstrate the power and effectiveness of this method.

It is another object to provide a method for pattern change discovery between high-dimensional data sets, comprising: determining a linear model of a dominant subspace for each pair of high dimensional data sets using at least one automated processor, and using matrix factorization to produce a set of principal angles representing differences between the linear models; defining a set of basis vectors under a null hypothesis of no statistically significant pattern change and under an alternative hypothesis of a statistically significant pattern change; performing a statistical test on the basis vectors with respect to the null hypothesis and the alternate hypothesis to automatically determine whether a statistically significant difference is present; and producing an output selectively dependent on whether the statistically significant difference is present.

A further object provides a nontransitory computer readable medium, comprising instructions for controlling a programmable processor to perform a method comprising: determining a linear model of a dominant subspace for each pair of high dimensional data sets using at least one automated processor, and using matrix factorization to produce a set of principal angles representing differences between the linear models; defining a set of basis vectors under a null hypothesis of no statistically significant pattern change and under an alternative hypothesis of a statistically significant pattern change; performing a statistical test on the basis vectors with respect to the null hypothesis and the alternate hypothesis to automatically determine whether a statistically significant difference is present; and producing an output selectively dependent on whether the statistically significant difference is present.

It is also an object to provide a system for determining pattern change discovery between high-dimensional data sets, comprising: an input configured to receive a pair of high dimensional data sets; at least one automated processor, configured to: determine a linear model of a dominant subspace for each pair of high dimensional data sets; factoring at least one matrix to produce a set of principal angles representing differences between the linear models; define a set of basis vectors under a null hypothesis of no statistically significant pattern change and under an alternative hypothesis of a statistically significant pattern change; and perform a statistical test on the basis vectors with respect to the null hypothesis and the alternate hypothesis to determine whether a statistically significant difference is present; and an output configured to communicate data selectively dependent on whether the statistically significant difference is present.

The statistical test may comprise a likelihood ratio test.

The automatically determining step is preferably unsupervised.

The method may further comprise determining a statistical significance of pattern changes between the dominant subspaces.

The high-dimensional data sets comprise semantic data, video data, and/or multimedia data. The high-dimensional data sets may comprise data representing a common source or location acquired at different times.

BRIEF DESCRIPTION OF THE DRAWINGS

FIG. 5A rank 1 event: a man is running towards a cart; FIG. 5B the test sequence; the star marks the time when this man begins running;

FIG. 6A rank 1 event: an earthquake occurs and people are running out; FIG. 6B shows the test sequence; the star marks the time when the earthquake occurs;

FIG. 7A rank 2 event: the car collision occurs; FIG. 7B rank 1 event: a man is running towards the accident scene; and FIG. 7C the test sequence; the star marks the time of the collision.

3. DETAILED DESCRIPTION OF THE PREFERRED EMBODIMENTS

Pattern change discovery between high-dimensional data sets may therefore be detected, by, for example, determining a linear model of a dominant subspace for each pair of high dimensional data sets, and using matrix factorization to produce a set of principal angles representing differences between the linear models. A set of basis vectors is defined under a null hypothesis of no statistically significant pattern change, and under an alternative hypothesis of a statistically significant pattern change. A statistical test is performed on the basis vectors with respect to the null hypothesis and the alternate hypothesis to determine whether a statistically significant difference is present.

The statistical test may employ a likelihood ratio statistic given by $$\Lambda = \frac{\|X - \hat{P}\hat{S}^T\|^2}{\|X - \hat{P}_H \hat{S}_H^T\|^2}$$

based on $\hat{P}$, $\hat{S}$ and $\hat{P}_H$, $\hat{S}_H$ wherein $\hat{P}$ and $\hat{S}$ represent estimates of $P_{m \times k}$ and $S_{n \times k}$ which are lower dimension factors whose product approximates the high dimensional data set matrix $X_{m \times n}$, k<<min(m,n), and $\hat{P}_H$ and $\hat{S}_H$ represent estimates of feature basis matrix $P_H$ and indicator matrix $S_H$, the statistical test comprising a standard likelihood ratio test performed by estimating P only based on linear model G with additive Gaussian noise, and then estimating P under constraint $H_0$: $P'^T P = 0$, and computing a likelihood ratio between the two cases, wherein on linear model G:X=PST+ε, where ε·j∼$N_{m \times 1}(0, \sigma_2 I_{m \times m})$, the likelihood function for G is $$L(P, S) = (2\pi\sigma^2)^{-mn} \exp\left[-\frac{1}{2\sigma^2}\|X - PS^T\|^2\right].$$

The maximum likelihood estimates subject to the null hypothesis constraint $H_0$:$P'^T P = 0$ $$\mathcal{L}(P, S) =$$
$$-\log L(P, S) + \lambda\|P^T P'\|^2 = \text{constant} + \frac{np}{2} + \frac{1}{2\sigma^2}\|X - PS^T\|^2 + \lambda\|P^T P'\|^2$$

may be found by iteratively minimizing $\mathcal{L}(P,S) = \|X-PS^T\|^2 + \lambda\|P^T P'\|^2$, wherein $$\lambda = \frac{1}{mk}\sum_{ij}\frac{(XS - PS^T S)_{i,j}}{(P'P'^T P)_{i,j}}.$$

PRELIMINARIES

3.1 Notations

As used herein, a matrix is denoted as a capital letter in boldface such as X. $X_{ij}$ is the entry in the ith row and the jth column. $X_{i\cdot}$ stands for the ith row of X and $X_{ij}$ stands for the jth column of X. A vector is a lowercase letter in boldface such as x. A scalar variable is denoted as a lowercase letter such as x. $U^T$ stands for the transpose of the matrix U. $X_{m \times n}$ stands for a matrix $X \in \mathbb{R}^{m \times n}$. span(A) stands for the subspace spanned by the column vectors of the matrix A. $\|\cdot\|$ by default is the Frobenius norm for a matrix; $\|\cdot\|^2$ is the 2-norm [7] for a matrix. diag($\{x_i\}$) stands for a diagonal matrix with $x_i$ as its ith diagonal entry.

3.2 Principal Angles and Dominant Subspace

Figure 1:
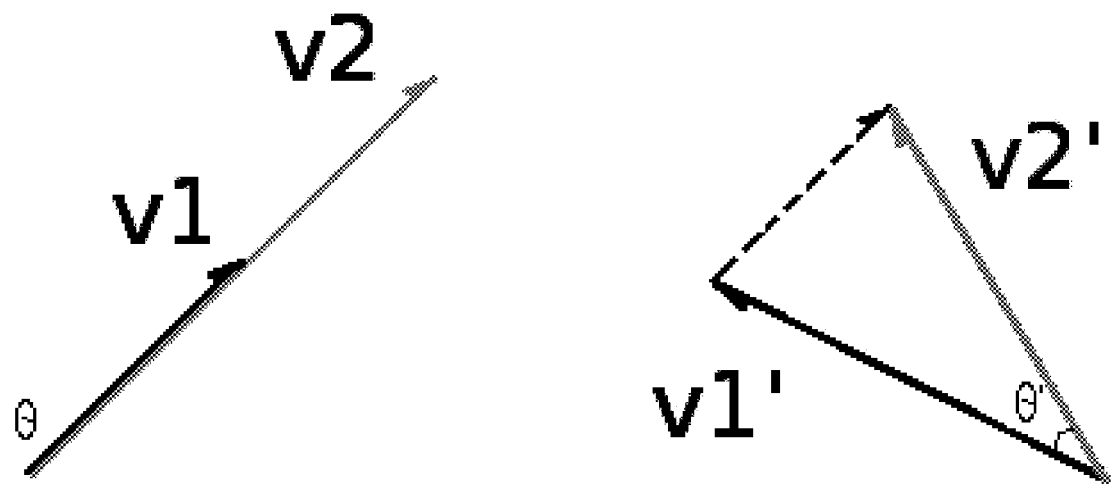
FIG. 1 shows the Euclidean metric fails to differentiate the length difference from the direction difference.
Figure 2A:
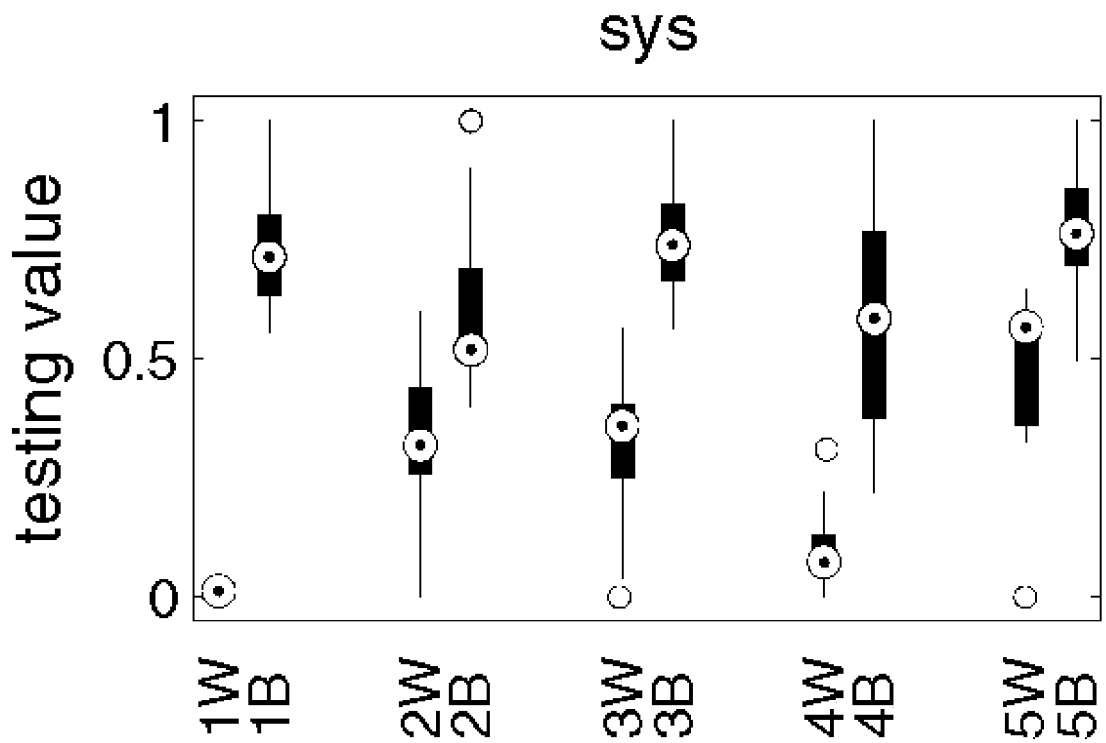
FIGS. 2A-2H show the detection performance of LRatio and 4 comparison methods. For each pair of W and B, a smaller overlap between W and B indicates a better performance.
Figure 2B:
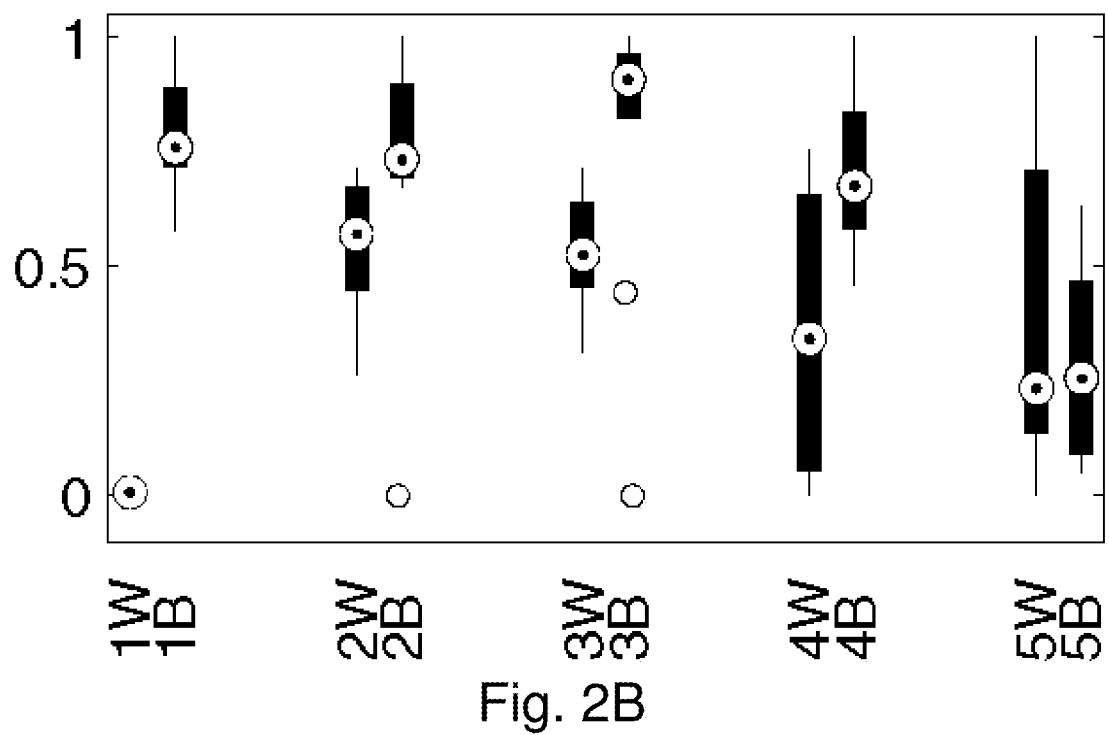
Figure 2C:
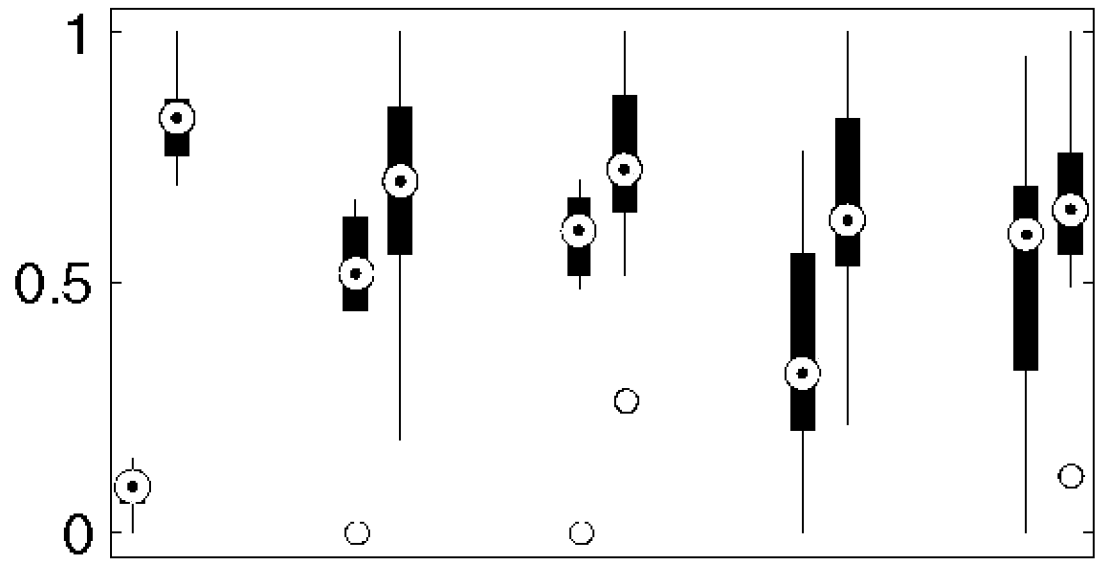
Figure 2D:
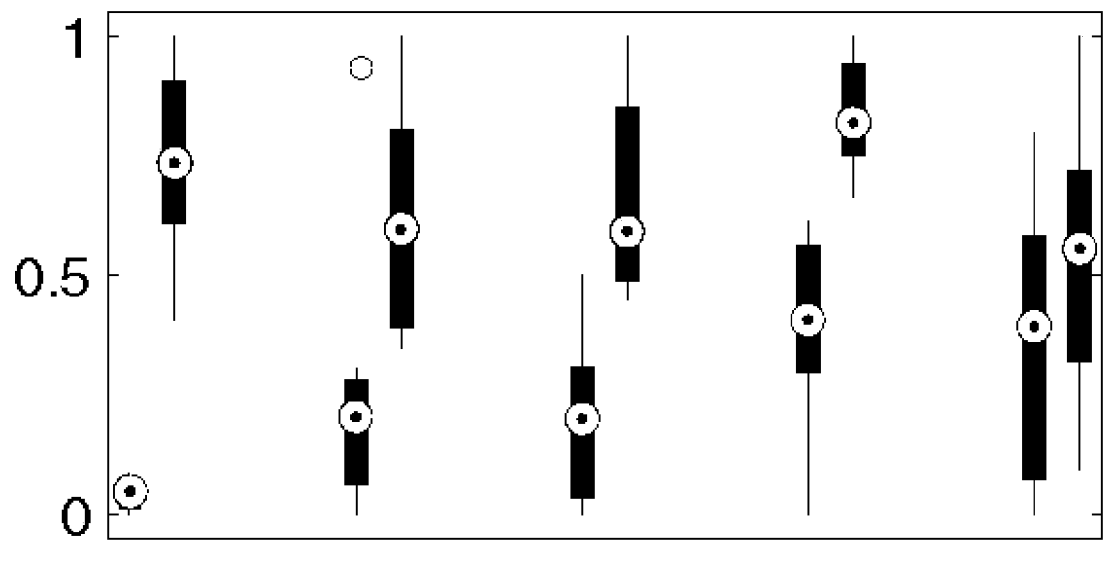
Figure 2E:
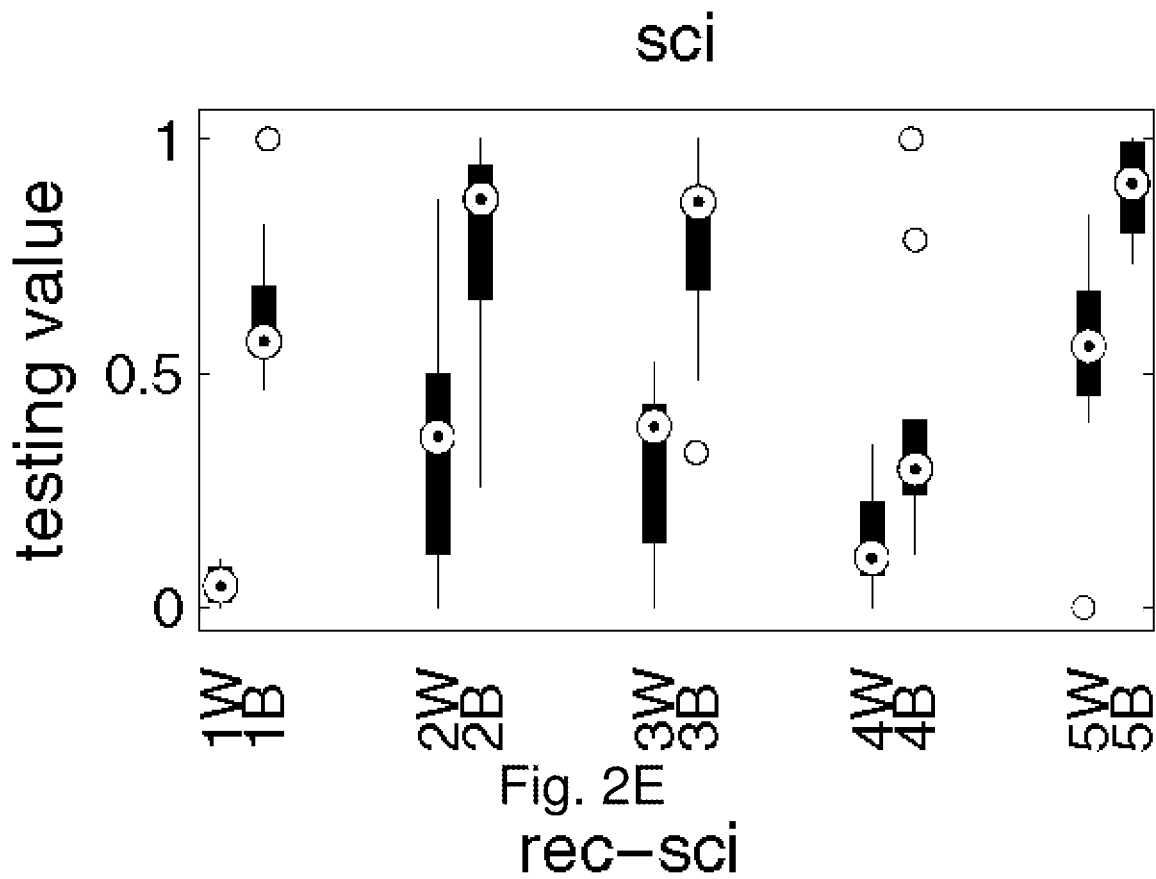
Figure 2F:
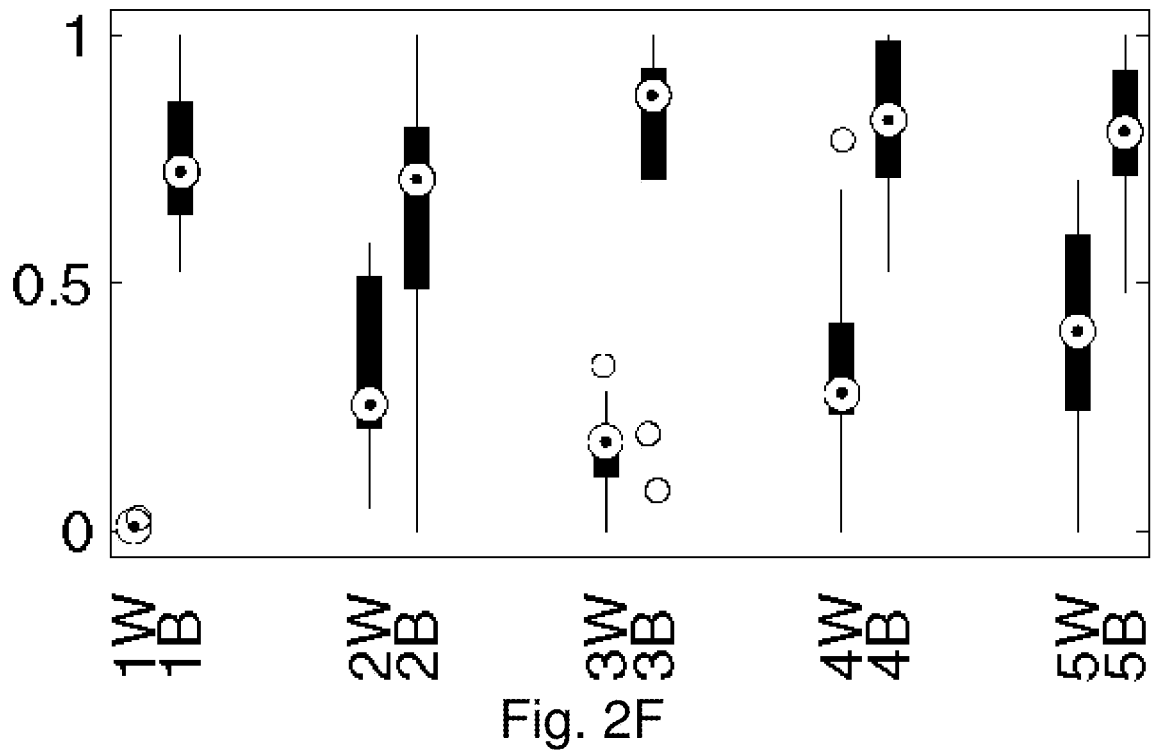
Figure 2G:
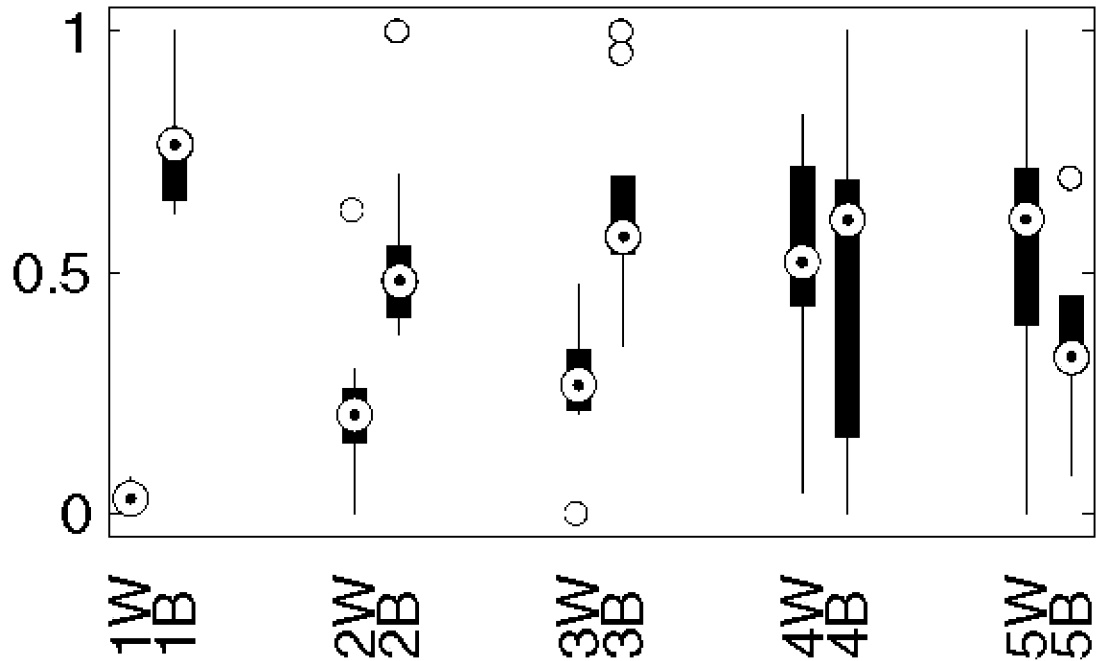
Figure 2H:
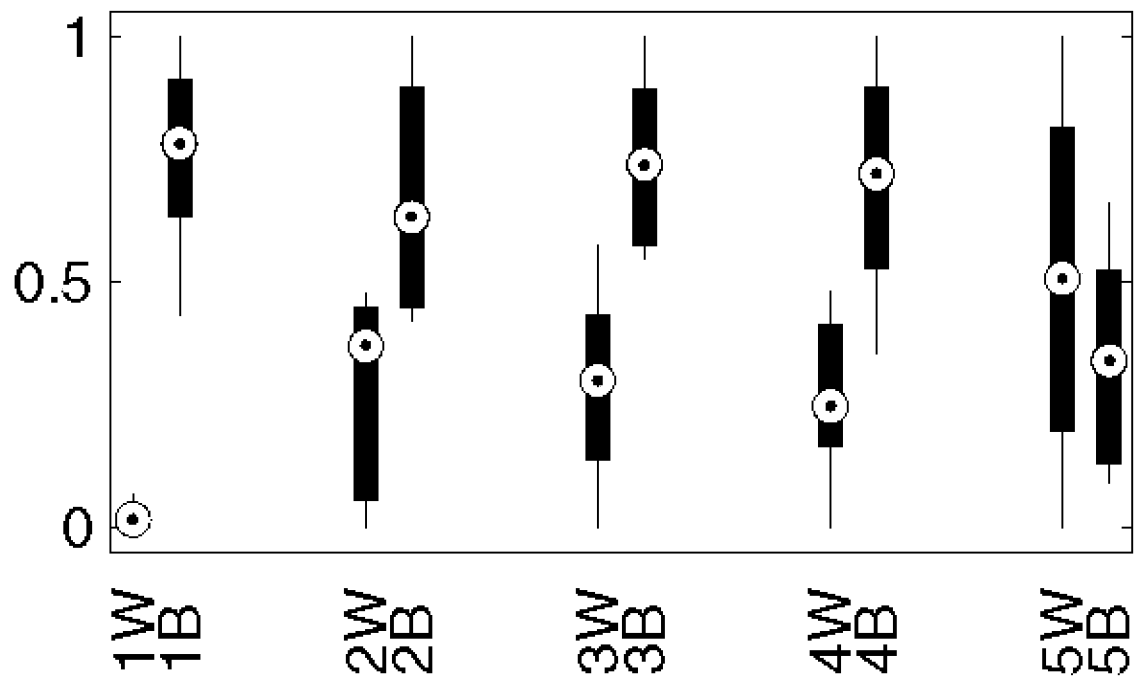

The principal angles between subspaces are used to measure the subspace difference between data sets of high dimensions. Discussed above are pitfalls of the popular distance metrics. Starting with the same example in FIG. 1, the Euclidean distance fails to detect θ≠θ', and therefore, is unable to differentiate the length difference from the direction difference introduced by the dimensionality. On the other hand, in this specific example, the principal angle between span($v_1$) and span($v_2$) is actually θ, and that between span($v_1$') and span($v_2$') is θ'. One may notice that we here use span(v) instead of just v. This indicates that θ and θ' are invariant under the length shrinking or stretching for the corresponding vectors. Now one can reasonably understand the notion of principal angles between two subspaces as a generalization of an angle between two vectors as the dimensionality goes from one (as for span($v_1$))

to n where n≥1. The principal angles have a very important property that all the Euclidean-based metrics do not have—Invariance under an isomorphism and thus independent of the magnitude change (e.g., invariant under scalar multiplication when the dimensionality is one).

Without loss of generality, assume two vector sets $\{x_i\}_{i=1}^m$, and $\{y_i\}_{i=1}^l$, $x_i, y_i \in \mathbb{R}^n$. Golub and Loan proposed in [7] the definition of principal angles as to measure the structural difference between the two subspaces $S_1 = \text{span}(\{x_i\}_{i=1}^m)$ and $S_2 = \text{span}(\{y_i\}_{i=1}^l)$: An increasing sequence of principal angles $\{\theta_k\}_{k=1}^q$, is defined between two arbitrary subspaces $S_1$ and $S_2$ using their orthonormal basis: ([7] Page 602):

Definition 1. Let $S_1$ and $S_2$ be subspaces in $\mathbb{R}^n$ whose dimensions satisfy $$p = \dim(S_1) \geq \dim(S_2) = q \geq 1$$

The principal angles $\theta_k \in [0, \pi/2]$, $k=1, \ldots, q$, between $S_1$ and $S_2$ are defined recursively as $$\cos(\theta_k) = \max_{u \in S_1, v \in S_s} u^T v = u_k^T v_k$$

when $k==1$; when $\|u_1\| = \|v_1\| = 1$; when $k \geq 2$, $\|u_k\| = \|v^k\| = 1$; $u_k^T u_i = 0$; $V_k^T v_i = 0$ where $i=1, \ldots, k-1$.

In this definition, vectors $\{u_k\}_{k=1}^q$, and $\{v_k\}_{k=1}^q$, are actually part of the orthonormal basis for $S_1$ and $S_2$; the inner products of each pair $u_k$ and $v_k$ form a unique increasing sequence of angles. These angles explicitly give the difference of the subspace structure between $S_1$ and $S_2$. The algorithm given in [7] to compute the principal angles takes $O(4n(q^2+2p^2)+2pq(n+q)+12q^3)$ in time complexity.

The leading largest principal angles depict the most noticeable structural difference between $S_1$ and $S_2$. The corresponding dimensions responsible for the largest principal angles are of great interest as they reflect the major pattern change. The subspace formed by these dimensions is called the dominant subspace. Now in order to measure the structural difference between $\{x_i\}_{i=1}^m$, and $\{y_i\}_{i=1}^l$, one may resort to directly computing the principal angles between $S_1$ and $S_2$, and then obtain the dominant subspace based on the largest principal angles. In practice, however, this is not an optimal solution. First, the values of n, p, and q in Definition 1 can be very large in real-world data sets, resulting in a high complexity to compute the principal angles. Second, since the real-world data sets typically contain noise and outliers, the principal angles directly computed from the raw data may not reflect the true situation. Third, in many applications, given a large amount of samples, one is only interested in the most frequent pattern changes in the majority of the data set and does not care of the principal angles for all the samples. All these issues require to developing an alternative solution to directly computing the principal angles. On the other hand, matrix factorization [16, 1, 4, 24] has been used extensively for reducing dimensionality and extracting collective patterns from noisy data in a form of a linear model.

Below, the principle of dominant subspace mapping through matrix factorization is developed as the alternative to obtain the dominant subspace.

4. MODEL FORMULATION

Given two data sets $X' = \{x'_i\}_{i=1}^{n'}$ and $X = \{x_i\}_{i=1}^n$, a model is presented to detect the pattern changes between X' and X. Instead of computing the principal angles directly, a more practical strategy is provided involving three steps: To establish a null-hypothesis on pattern change, to extract a set of basis vectors from $\text{span}(\{x_i\}_{i=1}^n)$ under a null and its alternative hypothesis, and a statistical test to confirm these changes. Principal angles, matrix factorization and linear models can work together to serve this purpose.

4.1 Matrix Factorization

Learning mixture patterns from data can be formulated as generalized[2] linear[2] models [8, 24] using the following matrix factorization term:

$$X \approx PS^T \quad (1)$$

where the matrix $X_{m \times n} = [x_1, x_2 \ldots x_n]$, $x \in \mathbb{R}^m$, consist of n data samples represented as the n column vectors. Matrices $P_{m \times k}$ and $S_{n \times k}$, $k \ll \min(m, n)$, are two lower-dimension factors whose product approximates the original data set X. The k column vectors of P are prototype patterns learned from X; the ith row of S is a soft indicator using k prototypes to restore the ith sample.

Thus, the columns of P can also be considered as an approximate generating set for the subspace containing samples $\{x_i\}_{i=1}^n$. In this modeling, we concentrate on P, the prototype patterns, and its changing behavior. S describes how the k prototypes are distributed among the n samples and may also contain useful information to characterize the dataset.

Another advantage for matrix factorization is its form as a linear model under which a hypothesis test can be developed. More specifically, given a linear model with additive Gaussian noise G: $X = PS^T + \varepsilon$, where $\varepsilon_{\cdot j} \sim N_{m \times 1}(0, \sigma^2 I_{m \times m})$, the preferred strategy is to check the pattern change in P by properly constructing a hypothesis on P and then applying the standard likelihood ratio test.

4.2 Principle of Dominant Subspace Mapping

In order to extract the plausible pattern changes, instead of directly computing the principal angles, the principle of dominant subspace mapping is developed by constructing and testing a hypothesis as follows. First, a hypothesis on the pattern matrix P is established. Assuming P' and P from the two data sets X' and X, since the principal angles $\{\theta_i\}_{i=1}^k$ between span(P') and span(P) indicate the scale of pattern changes, it is straightforward to set up the hypothesis on the principal angles to begin with. Now two options are available for the null-hypothesis: To assume no pattern change or to assume an obvious pattern change. If the former is chosen, there are two concerns. First, the possibility that two data sets obtained from different times or locations share the same subspace is almost zero, resulting in a hypothesis on an almost impossible event. Second, as shown in definition 1, the principal angles are computed via cos; the null-hypothesis of no pattern change gives $H_0: \|\text{diag}(\{\cos \theta_i\}_{i=1}^k)\| = k$, indicating that every principal angle is zero; such a setting is vulnerable due to different k value in different applications and no prior knowledge is available about the specific value of k. On the other hand, if the hypothesis is set as an obvious pattern change, it serves both purposes of detecting pattern change and a convenient form of $H_0: \|\text{diag}(\{\cos \theta_i\}_{i=1}^k)\| = 0$. If the hypothesis is true, the values of $\{\theta_i\}_{i=1}^k$ are large, indicating the large pattern change between span(P) $\subseteq \{c_i\}_{i=1}^n$ and span(P') $\subseteq \{x'_i\}_{i=1}^{n'}$. More importantly, this hypothesis is independent of the value k, making the detection more robust despite the possible information loss caused by matrix factorization.

While the hypothesis $H_0: \|\text{diag}(\{\cos \theta_i\}_{i=1}^k)\| = 0$ is straightforward, in order to construct a simple statistic test, a hypothesis is cast directly on P and P'. For this purpose, the following lemma is introduced:

Lemma 1. Given that $P' \in \mathbb{R}^{m \times p}$ and $P \in \mathbb{R}^{m \times q}$, each with linearly independent columns, and that each column is normalized into the same 2-norm length L, and further given the QR factorizations P=QR and P'=Q'R', the principal angles $\{\cos \theta_i\}_{i=1}^k$ between span(P) and span(P') satisfy inequality:

$$\frac{1}{pqL^2}\|P'^T P\| \le \|\text{diag}(\{\cos\theta_i\}_{i=1}^k)\| \le \frac{a}{|\sigma_1 \sigma_2|}\|P'^T P\| \quad (2)$$

here a≤pq is a constant, and $\sigma_1$ and $\sigma_2$ are the smallest eigenvalues of R' and R, respectively.

The proof of Lemma 1 uses the method in [7] for computing the principal angles.

Given $A \in \mathbb{R}^{m \times p}$ and $B \in \mathbb{R}^{m \times q}$ (p≥q), each with linearly independent columns, the principal angles between subspaces span(A) and span(B) can be computed as follows. First, compute the QR factorizations for A and B, respectively $$A = Q_A R_A \quad Q_A^T Q_A = I_p, \quad R_A \in \mathbb{R}^{p \times p}$$
$$B = Q_B R_B \quad Q_B^T Q_B = I_p, \quad R_B \in \mathbb{R}^{q \times q}$$

Then, let $C = Q_A^T Q_B$ and compute the SVD (singular value decomposition) of C such that $Y^T CZ = \text{diag}(\cos \theta)$, where $\text{diag}(\cos \theta)$ is short for the diagonal matrix with the cosines of the principal angles $\{\cos \theta_1, \cos \theta_2 \ldots \cos \theta_q\}$ as the diagonal elements.

Since $$\|\text{diag}(\cos \theta)\|^2 = \|Y(Q^T Z)Z\|^2 = \|(Q^T Q')\|^2$$

where $\text{diag}(\cos \theta) = Y(Q^T Q')Z$ is the SVD of $Q^T Q'$. The inequality can now be re-written as:

$$\frac{1}{pqL^2}\|P'^T P\| \le \|Q^T Q'\|^2 \le \frac{a}{|\sigma_1 \sigma_2|}\|P'^T P\| \quad (9)$$

For the left hand side inequality, since $\|P\|=\|QR\|=\|R\|=pL$ and similarly $\|P'\|=\|R'\|=qL$, then $$\|P^T P'\| = \|R^T Q^T Q'R'\| \le \|R\|\|Q^T Q'\|\|R'\| = pqL^2\|Q^T Q'\|$$

For the right hand side inequality, $$\|Q^T Q'\| = \|(RR^{-1})Q^T Q'(R'R'^{-1})\| = \|R^{-1}P^T P'R'^{-1}\| \le$$
$$\|R^{-1}\|\|P^T P'\|\|R'^{-1}\| \quad (10)$$

Since R and R' are upper triangular, the inverses $R^{-1}$ and $R'^{-1}$ are also upper triangular. Therefore, the eigenvalues of R are $\{(R)_{ii}|i=1,\ldots,p\}$, the diagonal entries of R. Hence, the eigenvalues of $R^{-1}$ are $\{1/(R)_{ii}\}$, the inverse of the diagonal entries of R. The same conclusion also holds true for $R'^{-1}$. Thus, $$\|R^{-1}\| \le \|\text{diag}((R)_{ii}^{-1})\| \le \frac{p}{|\sigma|} \quad (11)$$
$$\|R'^{-1}\| \le \|\text{diag}((R')_{ii}^{-1})\| \le \frac{p}{|\sigma'|}$$

Combining (10) and (11)

$$\|Q^T Q'\| \le \frac{a}{|\sigma \sigma'|}\|P^T P'\|$$

where a≤pq.

Lemma 1 gives the upper and lower bounds of $\|\text{diag}(\{\cos \theta_i\}_{i=1}^k)\|$ in terms of $\|P'^T P\|$. More importantly, due to the Sandwich Theorem, $\|P'^T P\|$ and $\|\text{diag}(\{\cos \theta_i\}_{i=1}^k)\|$ are asymptotically equivalent as $\|\text{diag}(\{\cos \theta_i\}_{i=1}^k)\|$ is close to zero. Therefore, a hypothesis using P and P' directly is established, as shown in the following Corollary 1:

The null-hypothesis $H_0: \|\text{diag}(\{\cos \theta_i\}_{i=1}^k)\| = 0$ has its equivalent form of $$H_0: P'^T P = 0 \quad (3)$$

4.3 Likelihood Ratio Test

Given the simple form of null-hypothesis $H_0: P'^T P = 0$ on linear model G: $X = PST + \varepsilon$, where $\varepsilon_{\cdot j} \sim N_{m \times 1}(0, \sigma_2 I_{m \times m})$, one can use the standard likelihood ratio test for verification ([23] Page 98): First, estimate P only based on linear model G. Second, estimate P under constraint $H_0$. Finally, compute the likelihood ratio between the two cases.

To estimate P only based on the given linear model G: $X = PST + \varepsilon$, where $\varepsilon_{\cdot j} \sim N_{m \times 1}(0, \sigma_2 I_{m \times m})$, the likelihood function for G is [23]

$$L(P, S) = (2\pi \sigma^2)^{-mn} \exp\left[-\frac{1}{2\sigma^2}\|X - PS^T\|^2\right]. \quad (4)$$

Maximizing the likelihood function (4) is equivalent to estimating the factors P and S that minimize $\|X - PS^T\|^2$. This normal-distribution-based matrix factorization can be efficiently solved via the multiplicative iteration algorithm proposed by Lee and Seung in [16, 17]:

$$P_{ij}^{update} = P_{ij}\frac{(P^T X)_{ij}}{(PS^T S)_{ij}}; \quad (5)$$

$$S_{ij}^{update} = S_{ij}\frac{(X^T P)_{ij}}{(SP^T P)_{ij}}$$

The proof of the convergence of the updating rule can be found in [17]. This updating rule generates the estimation $\hat{P}$ and $\hat{S}$.

---

Algorithm 1 LRatio

Input: data sets X, X', and threshold h.
Output: Feature basis $P_H$, indicator matrix $S_H$, the likelihood ratio test statistic $\Lambda$, and the testing result.
Method:
1: Initialize P', S', $\hat{P}$, $\hat{S}$, $\hat{P}_H$ and $\hat{S}_H$, and $\lambda$ randomly.
2: Iteratively update P' and S' using (5) until convergence
3: Iteratively update $\hat{P}$ and $\hat{S}$ using (5) until convergence
4: Iteratively update $\hat{P}_H$ and $\hat{S}_H$ using (7) until convergence
5: Compute $\Lambda$ using (8)
6: Reject $H_o$ if $\Lambda$ is smaller than h.

Finding the maximum likelihood estimates subject to the constraint (3) gives the following log likelihood function ([23] Page 98):

$$\mathcal{L}(P, S) = -\log L(P, S) + \lambda \|P^T P'\|^2 = \text{constant} + \frac{np}{2} + \frac{1}{2\sigma^2} \|X - PS^T\|^2 + \lambda \|P^T P'\|^2$$

which is equivalent to minimizing:

$$\mathcal{L}(P, S) = \|X - PS^T\|^2 + \lambda \|P^T P'\|^2 \qquad (6)$$

where $\lambda > 0$ is the Lagrange multiplier. To solve this constrained optimization problem, the non-increasing updating rule is given through the following Lemma:

Lemma 2. The loss function (6) is non-increasing under the updating rule:

$$P_{ij}^{update} = P_{ij} \frac{(XS)_{ij}}{(PS^T S + \lambda P' P'^T P)_{ij}} \qquad (7)$$

$$S_{ij}^{update} = S_{ij} \frac{(X^T P)_{ij}}{(SP^T P)_{ij}}$$

$$\lambda^{update} = \frac{1}{mk} \sum_{ij} \frac{(XS - PS^T S)_{ij}}{(P' P'^T P)_{ij}}$$

The loss function (6) is invariant under this rule if and only if P and S are at a stationary point of the loss function.

The proof of lemma 2 proceeds by first proving the convergence of the updating rules for P and S, then determining the value of A. To prove the updating rules for P and S, an auxiliary function similar to that used in the Expectation-Maximization algorithm [17] is used.

Definition 2. $G(u, u')$ is an auxiliary function for $F(u)$ if the conditions $$G(u,u') \geq F(u), G(u,u) = F(u) \qquad (12)$$

are satisfied.

The auxiliary function is a useful concept due to the following lemma:

Lemma 3. If G is an auxiliary function, then F is nonincreasing under the update:

$$u^{t+1} = \arg\min_u G(u, u^t) \qquad (13)$$

Proof. $F(u^{t+1}) \leq G(u^{t+1}, u^t) \leq G(u^t, u^t) = F(u^t)$

By defining the appropriate auxiliary function $G(u, u^t)$ for (6), the update rule in Lemma 2 easily follows from (13). Now let $u = P_i^T$, $h' = P'_i^T$.

Lemma 4. Function $$G(u,u^t) = (u^t) + (u-u^t)^T \nabla F(u^t) + \frac{1}{2}(u-u^t)^T K(u^T)(u-u^t) \qquad (14)$$

is an auxiliary function for $$F(u) = \frac{1}{2} \sum_i \left(x_i - \sum_a S_{ia} u_a\right)^2 + \frac{1}{2} \sum_a (u'_a u_a)^2 \qquad (15)$$

where $K(u^t)$ is a diagonal matrix defined as $$K_{ab}(u^t) = \delta_{ab}(S^T S u + \lambda u'^T u' I u)_a / u_a^t \qquad (16)$$

Proof. Since $G(u, u) = F(u)$ is obvious, we only need to show that $G(u, u^t) \geq F(u)$. To do this, we compare $$F(u) = F(u^t) + (u-u^t)^T \nabla F(u^t) + \frac{1}{2}(u-u^t)^T (S^T S + \lambda u'^T u' T)(u-u^t) \qquad (17)$$

with (14) to find that $G(u, u^t) \geq F(u)$ is equivalent to $$0 \leq (u-u^t)^T [K(u^t) - (S^T S + \lambda u'_T u' T)](u-u^t) \qquad (18)$$

To prove the positive semidefiniteness, consider the matrix $$M_{ab}(u^t) = u_a^t (K(u^t) - (S^T S + \lambda u'^T u' T))_{ab} u_b^t \qquad (19)$$

which is a rescaling of the components of $K(u^t) - (S^T S + \lambda u'^T u' T)$. Then, $K(u^t) - (S^T S + \lambda u'^T u' T)$ is positive semidefinite if and only if M is, and $$v^T M v = \sum_{ab} v_a M_{ab} v \qquad (20)$$

$$= \sum_{ab} u_a^t (S^T S + \lambda u'^T u' I)_{ab} u_b^t v_a^2 -$$

$$v_a v_a^t (S^T S + \lambda u'^T u' I)_{ab} u_b^t v_b$$

$$= \frac{1}{2} \sum_{ab} (S^T S + \lambda u'^T u' I)_{ab} u_a^t u_b^t [v_a^2 + v_b^2 - 2 v_a v_b]$$

$$= \frac{1}{2} \sum_{ab} (S^T S + \lambda u'^T u' I)_{ab} u_a^t u_b^t (v_a - v_b)^2$$

$$\geq 0$$

This leads to the proof of the updating rule for P in Lemma 2.

Proof. Applying update rule (13) to the auxiliary function (14) results in:

$$u^{t+1} = u^t - K(u^t)^{-1} \nabla F(u^t) \qquad (21)$$

Lemma 3 guarantees that F is non-increasing under this update rule. Writing the component of this equation explicitly, $$P_{ij}^{t+1} = P'_{ij} \frac{(XS)_{ij}}{(PS^T S + \lambda P' P'^T P)_{ij}} \qquad (22)$$

The proof of update rule for S is the same as that in [17].

The approach to determine $\lambda$ is more straightforward. Since $\lambda$ only controls the convergence rate of P and S, theoretically its value does not influence the final convergence of P and S. The course is set to regularize A by using standard Lagrange multiplier procedure. Let $$\frac{\delta \mathcal{L}(P, S)}{\delta P} = PS^T S - XS + \lambda P' P'^T P = 0$$

We then get $$\lambda = \frac{(XS - PS^T S)_{ij}}{(P' P'^T P)_{ij}}.$$

During the update, each entry of P and S may have different gradient speed, so λ is set to be the average $$\lambda = \frac{1}{mk} \sum_{ij} \frac{(XS - PS^T S)_{i,j}}{(P'P'^T P)_{i,j}}$$

as given in Lemma 2.

Using updating rule (7), we obtain estimation $\hat{P}_H$ and $\hat{S}_H$ under the null hypothesis. The time complexity of the updating rule (7) for each iteration is $\mathcal{O}$ (mnk+k²m), where m, n, and k are defined at the beginning of Section 4.1.

After we obtain the estimation of $\hat{P}$, $\hat{S}$ and $\hat{P}_H$, $\hat{S}_H$, the likelihood ratio statistic is given by ([23] Page 99):

$$\Lambda = \frac{\|X - \hat{P}\hat{S}^T\|^2}{\|X - \hat{P}_H \hat{S}_H^T\|^2} \quad (8)$$

According to the likelihood principle, a small Λ indicates a bad estimation of $\hat{P}_H$ and $\hat{S}_H$, and $H_o$ is rejected. On the other hand, a large value of Λ suggests a pattern change detected in $\hat{P}_H$. The algorithm, called LRatio, is summarized in Algorithm 1.

The time complexity of the updating rule (5) is $\mathcal{O}$ (mnk) in each iteration, and that of (7) is $\mathcal{O}$ (mnk+k²m) in each iteration; the complexity to compute Λ is $\mathcal{O}$ (mnk), where m, n, and k are defined in Section 4.1. Thus, the total time complexity is $\mathcal{O}$ (mnk+k²m) for each iteration, which is much lower than that of directly computing the principal angles between X and X'.

TABLE 1

Configuration of the pattern change data sets.

| Name | Part 1 | Part 2 | Sample no. | Dim. |
|---|---|---|---|---|
| sys | comp.sys.ibm.pc | comp.sys.mac | 400 × 2 | 1558 |
| ossys | comp.os.ms-windows.misc, comp.sys.ibm.pc | comp.sys.mac, comp.windows.x | 200 × 4 | 2261 |
| computer | comp.graphics, comp.os.ms-windows.misc, comp.sys.ibm.pc | comp.sys.ibm.pc, comp.sys.mac, sci.electronics | 100 × 6 | 1606 |
| socialtalk | talk.politics.guns, talk.politics.mideast, talk.politics.misc, talk.religion.misc | alt.atheism, soc.religion.christ, talk.politics.misc, talk.religion.misc | 100 × 8 | 3312 |
| sci | sci.crypt | sci.med | 400 × 2 | 2870 |
| rec-sci | rec.sport.baseball, rec.sport.hockey | sci.electronics, sci.space | 200 × 4 | 2800 |
| comp-sci | comp.graphics, comp.os.ms-windows.misc, comp.sys.ibm.pc | sci.electronics, sci.med, sci.space | 100 × 6 | 1864 |
| rec-talk | rec.autos, rec.motorcycles, rec.sport.baseball, rec.sport.hockey | talk.politics.guns, talk.politics.mideast, talk.politics.misc, talk.religion.misc | 100 × 8 | 2992 |

5. EXPERIMENTS

In order to demonstrate the power and promise of LRatio as well as its superiority to the existing literature in discovering significant pattern changes in different applications in the real-world, the LRatio is applied to several different real-world problems in comparison with the existing methods in the related literature in these different applications.

5.1 Topic Change Detection among Documents

The goal of the first application is to verify the performance of LRatio test using collections of text documents. In this application, the standard 20-newsgroup data sets [14] are used, the dimension scale of which is of thousands. As listed in Table 1, eight scenarios are constructed using different topic combinations. For each scenario, two parts are set up (Part 1 and Part 2). Each part contains articles evenly mixed from one or more topics. Under each scenario, if the two data sets are sampled from the same part, they should bear similar subspace structure; while if the two data sets are from different parts, their subspace structures are different and LRatio test should be able to reflect this difference through the testing statistic. These eight scenarios are constructed to showcase data sets with different structural complexities and/or pattern change strengths. The first four scenarios intend to imitate moderate pattern change by electing similar topics between the two parts. The next four scenarios imitate strong pattern change by setting different topics between the two parts. The performance of LRatio is compared with the following methods.

Baseline. The standard K-means is applied to each of the two data sets to obtain the data matrices composed of the K centroids, respectively, and then the subspaces distance computed between the pair of the K centroids based on Definition (1). Intuitively, a pattern change results in a large distance. This distance is used as a statistic to indicate the pattern change, and its sensitivity compared with LRatio test. For the reference purpose, this baseline method is called KM.

Peers. Three different concept drift detection methods are used in the recent literature [5] by Dries and Rückert for a peer comparison. They are PCA-Bayesian Margin Test and two other error rate-based test methods. For the reference purpose, they are referred to as SVM-margin, SVMsigmoid, and SVM-(0,1), respectively. The reasons these comparing methods are selected are the following. First, under the framework of support vector machine (SVM), their methods are suitable for high-dimensional data sets. Second, although based on supervised techniques, the model does not require real labels and therefore can be used in unsupervised applications. Third, these methods are in a similar two-sample statistical test framework to that of LRatio, resulting in a fair comparison environment. In order to verify the detection sensitivity, the testing statistics of the data set pair having no pattern change in between are compared with the testing statistics of the data set pair involving a pattern change in between. The evaluation protocol is defined as follows.

For each scenario,
1. Obtain testing statistic from data set pair with no pattern change in between:
   i). Constructing two data sets by randomly sampling 200 articles, each dataset with 100 samples, only from Part 1 (or Part 2).
   ii). Applying LRatio and the four comparison methods on the two data sets.
   iii). Repeating i) and ii) 20 times.
2. Obtain testing statistic from data set pair with pattern changes in between:
   i). Constructing the first data set by randomly sampling 100 articles form Part 1; constructing the second data set by randomly sampling 100 articles from Part 2.

ii). Applying LRatio and the four comparison methods on the two data sets.

iii). Repeating i) and ii) 20 times.

3. For each method, normalize the 40 testing statistics to the range of [0, 1] for easy comparison.

Ideally, there should be a big gap between the first 20 testing statistics and the last 20 testing statistics, because the first 20 tests are from the dataset pair that has no pattern change, and the last 20 tests are from the data set pair with pattern changes. FIGS. 2A-2H show the detection performance of LRatio and 4 comparison methods. For each pair of W and B, a smaller overlap between W and B indicates a better performance: 1 shows the LRatio; 2 shows SVM—(0,1); 3 shows SVM—sigmoid; 4 shows the SVM—margin; and 5 shows KM W Sampling. Within each part; B shows Sampling Between two Parts.

FIGS. 2A-2H document all the results of this experiment, where a boxplot is used to represent the numerical distribution of the statistics obtained from the sampling within each part (red boxplots) and sampling between two parts (blue boxplots). In each boxplot, the median (in ⊙), the 25th percentile (in bars), the $75^{th}$ percentiles (in whiskers) and the outliers (in °) of the distribution are drawn. Consequently, for each method and for each of the eight collections, there is a corresponding pair of boxplots representing the statistic distributions for sampling within each part (red boxplot labeled with letter W) and for sampling between two parts (blue boxplot labeled with letter B), respectively. Clearly, more overlap between the pair of boxplots indicates the worse performance in discovering the pattern change for the method. From the figure, all the four comparing methods have the overlaps in the majority of the eight collections; in comparison, LRatio is the only method that has no overlap at all for all the eight collections; further, for the first four scenarios where there expects to be only moderate topic changes between the two parts, LRatio still clearly stands out with no overlap at all between the two boxplots. This demonstrates that LRatio is not only powerful in discovering pattern changes, but also very sensitive to the pattern changes.

5.2 Event Detection from News Streams

While the 20 newsgroups data experiment is for systematic evaluations of the pattern change discovery capabilities and sensitivities, the next experiment is an application scenario of event detection in a news stream data set. Google news data was manually collected everyday from October 23 to November 22 for the year of 2008 for four specific tracks: political news, financial news, sports news, and entertainment news. To form the news stream data for each of the four tracks, the news documents are grouped and time-stamped in a unit of every three neighboring days. Since all the five methods used in the previous experiments are for pattern change discovery between two data sets, each of them is applied to each pair of the neighboring units of the news stream in each track to obtain the statistic value. Consequently, for the whole month news data in each track, each method generates a statistic sequence, which is called the test sequence for the track of the news for the corresponding method.

Figure 3:
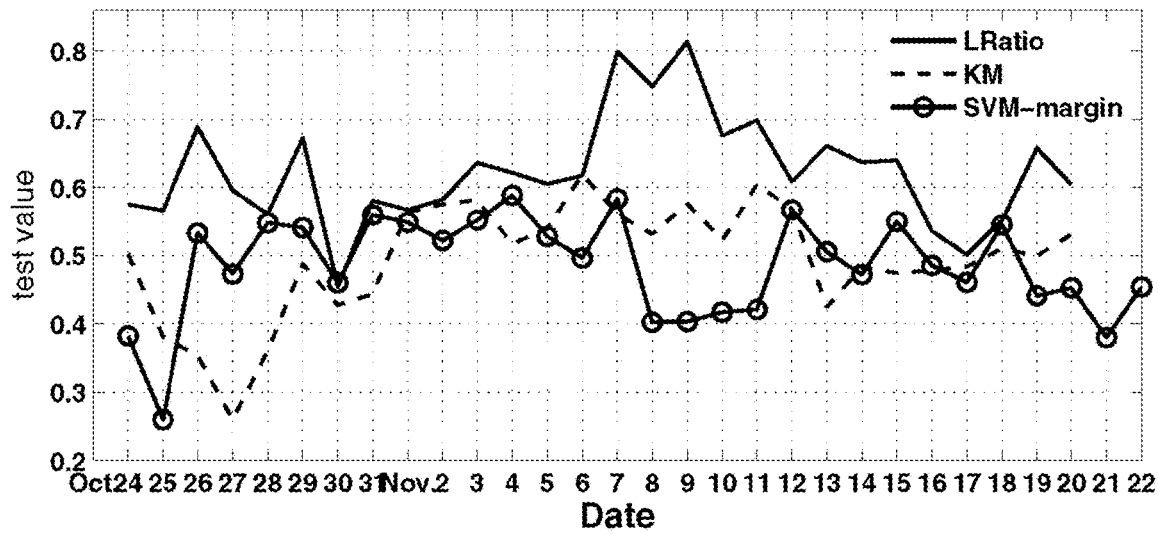
FIG. 3 shows test sequences for Google political news stream.

FIG. 3 documents the political news test sequences within the window between Oct. 23, 2008, and Nov. 22, 2008 for LRatio, KM, and SVM-margin. Since the three methods from [5] are very close in performance, for the clarity purpose in the figure, only the test sequence of SVM-margin in this figure is shown. Presumably in the figure for each method a significant peak in the test sequence means a significant pattern change, indicating that significant news events are detected by this method on that day. Everyday's news data within this whole month was manually examined to provide the ground truth regarding whether there are any significant news events on everyday of the month, and annotated the specific events.

Figure 4A:
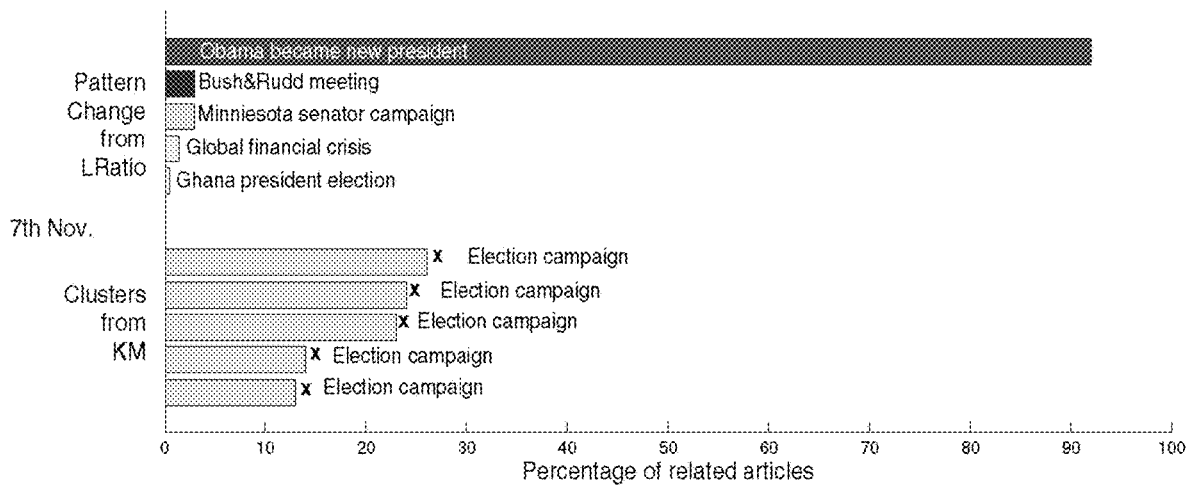
FIGS. 4A, 4B, and 4C show pattern changes detected by LRatio vs. Clusters found by KM. 'x' marks the old news topics that have been detected in the previous days. Boxes with the same colors are related to the same news topics.
Figure 4B:
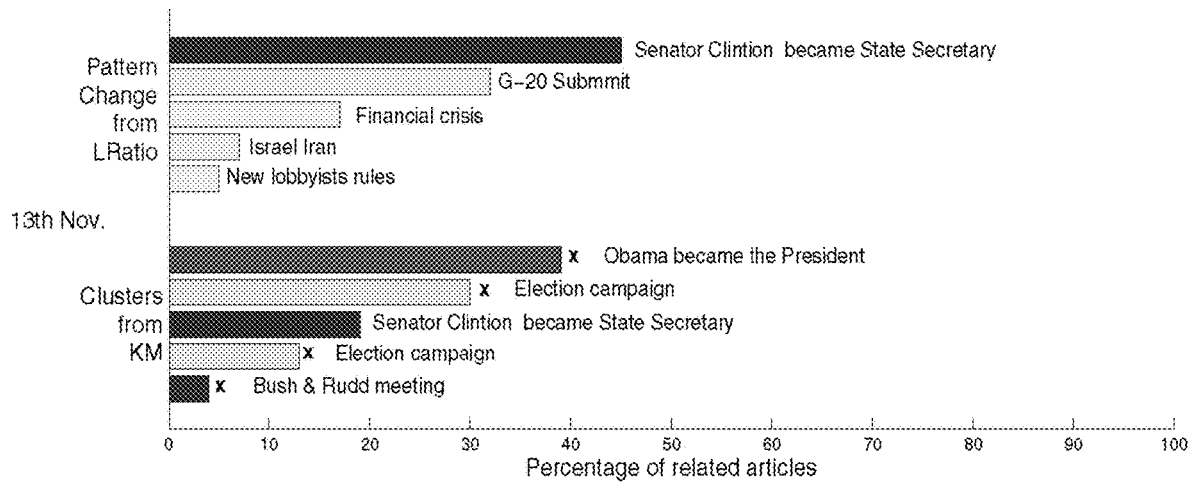
Figure 4C:
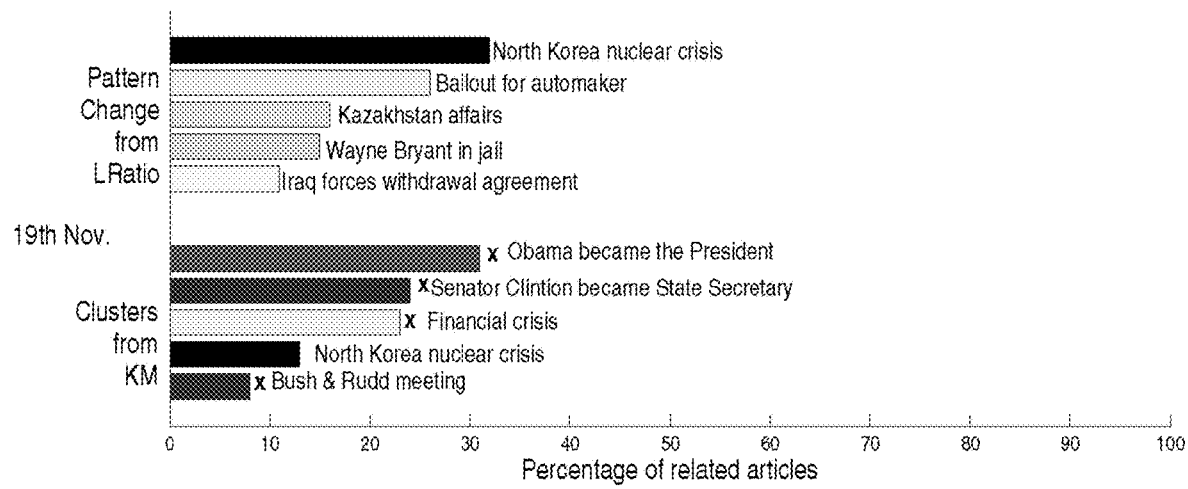

FIGS. 4A-4C show pattern changes detected by LRatio v.s. Clusters found by KM. 'x' marks the old news topics that have been detected in the previous days. Boxes with the same colors are related to the same news topics Since both LRatio and KM conduct the pattern change discovery through the clustering manner, they are both further able to detect the specific events through key words in each cluster, and are able to rank the "significance" of each detected event based on the number of samples in each cluster. FIGS. 4A-4C document the top five detected significant events on November 7, November 13, and November 19 for both methods, respectively, where each event is represented using a bar with the length proportional to the significance of the event, and the same event is ground-truthed with the same color. From these figures, there are three observations. First, for each of the three days, all the five detected events by LRatio are unique and distinct, while there are many duplications of the five top events detected by KM when compared with the ground truth; this is particularly true for November 7 where all the five top events detected by KM are about the Election Campaign. Second, as is also observed in FIG. 3, for many events KM is unable to detect them "in time" but rather with a delay; in other words, for many of the news events KM detected are actually old news events. For example, the event that Obama was elected as the US President occurred on November 7 (which LRatio corrected detected in time) is declared as the number one detected event for KM both on November 13 and on November 19, but not on November 7. In fact, for all the three days' top five events detected by KM, only the event Senator Clinton Became Secretary of State on November 13 and the event North Korea Nuclear Crisis on November 19 are caught by KM in time, whereas all others are actually old news events. Third, the specific event data reported in FIGS. 4A-4C coincide with the holistic event detection results reported in FIG. 3 very well. Of all the three days, KM essentially only detected old news events, and that is why in FIG. 3 on these three days there is no peak in the KM test sequence curve, indicating KM fails to detect any significant events for these three days. While SVM-margin does not have the capability to do the clustering analysis to report the specific events detected on each day as LRatio and KM do, it detects the events based on a holistic analysis reported in the test sequence shown in FIG. 3, from which it is clear that SVM-margin still fails to detect any significant events on November 13 and November 19 with an exception on November 7 because the event Obama Became US President was such an obvious significant event that SVM-margin did not miss.

The difference in performance between LRatio and the comparing methods is obvious. LRatio aims at discovering pattern changes regardless of whether the pattern changes come from a completely new topic or a new direction of an existing topic. KM, on the other hand, aims at discovering major clusters from the data; thus, new topics need time to "accumulate" to form clusters in order to become significant topics, while new directions of an existing topic are likely to be absorbed into the clusters and would never show up until they eventually dominate the clusters. That is why KM always misses many significant events and often detects an event with a delay in time. For SVM-margin, SVM-(0,1), and SVM-(sigmoid), although they also aim at discovering pattern changes, they work well only when the data have a simple structure and the majority of the samples bear a similar pattern change, which also explains why they only provide a holistic statistic on event detection with no capability for the specific pattern changes.

5.3 Event Detection in Surveillance Video

Finally, the application of LRatio is applied to the surveillance video stream data to detect events. In this context, each frame of the video stream is considered as a sample vector. Like the news data stream in the previous experiment, here again LRatio is applied to each pair of neighboring video segments (each segment has 100 frames) to see whether there is any event occurred. To demonstrate the power of the surveillance event detection capability, LRatio is applied to several different video surveillance data sets collected at different specific surveillance applications. FIGS. 5 to 7 showcase three different tests of using LRatio for surveillance event detection, where in each of the figures the left panel is a snapshot of the surveillance video stream and the right panel indicates the test sequence of LRatio along the timeline.

Figure 5A:
FIGS. 5A and 5B show detection result for video 1.
Figure 5B:
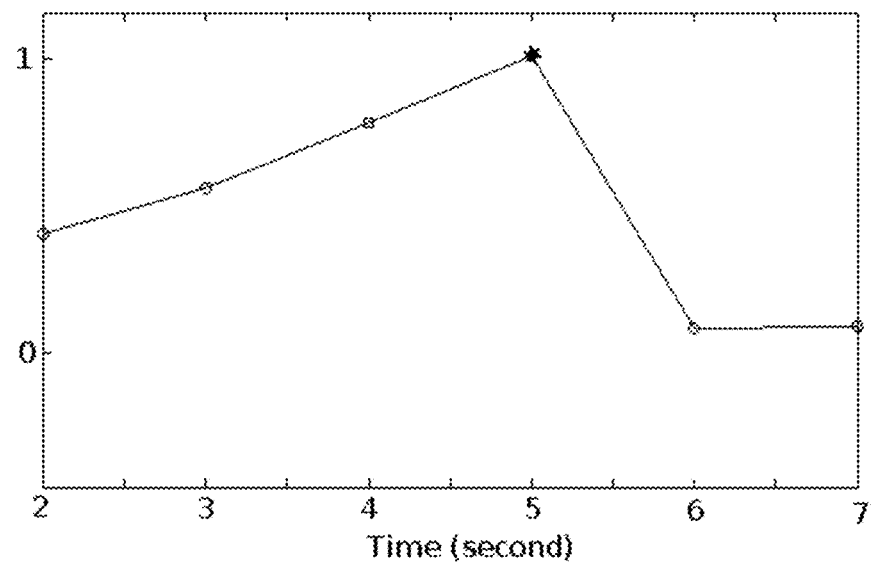

FIGS. 5A and 5B show the detection result for video 1; (a) rank 1 event: a man is running towards a cart; and (b) the test sequence; the star marks the time when this man begins running.

Figure 6A:
FIGS. 6A and 6B show detection results for video 2.
Figure 6B:
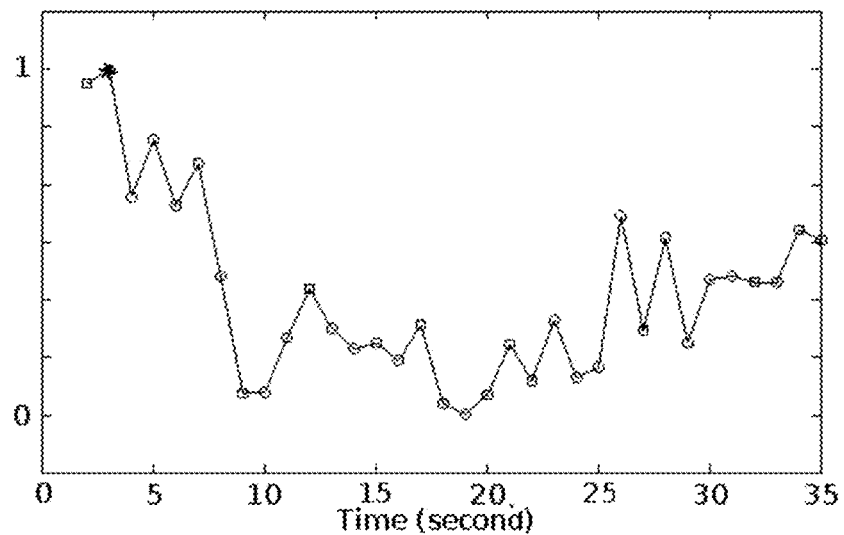

FIGS. 6A and 6B show the detection result for video 2; (a) rank 1 event: an earthquake occurs and people are running out; and (b) the test sequence; the star marks the time when the earthquake occurs.

Figure 7A:
FIGS. 7A, 7B and 7C show detection results for video 3.
Figure 7B:
Figure 7C:
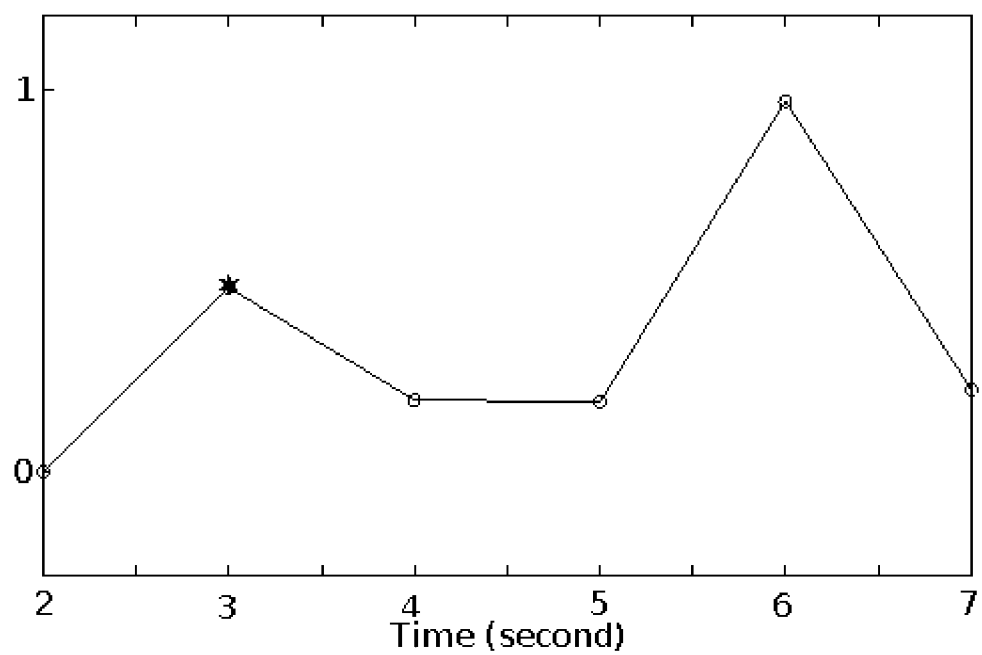

FIGS. 7A-7C show the detection result for video 3: (a) rank 2 event: the car collision occurs; (b) rank 1 event: a man is running towards the accident scene; and (c) the test sequence; the star marks the time of the collision.

6. CONCLUSION

The very general problem of pattern change discovery among different high dimensional data sets which exist everywhere in almost every application in the real-world was studied, and an approach identified based on the principal angles to discover the pattern change. The principle of the dominant subspace mapping to transfer the principal angle based detection to a matrix factorization problem through a hypothesis testing is introduced. Finally, the different applications of this solution in several specific real-world applications are considered to demonstrate the power and effectiveness of this method.

7. HARDWARE OVERVIEW

Figure 8:
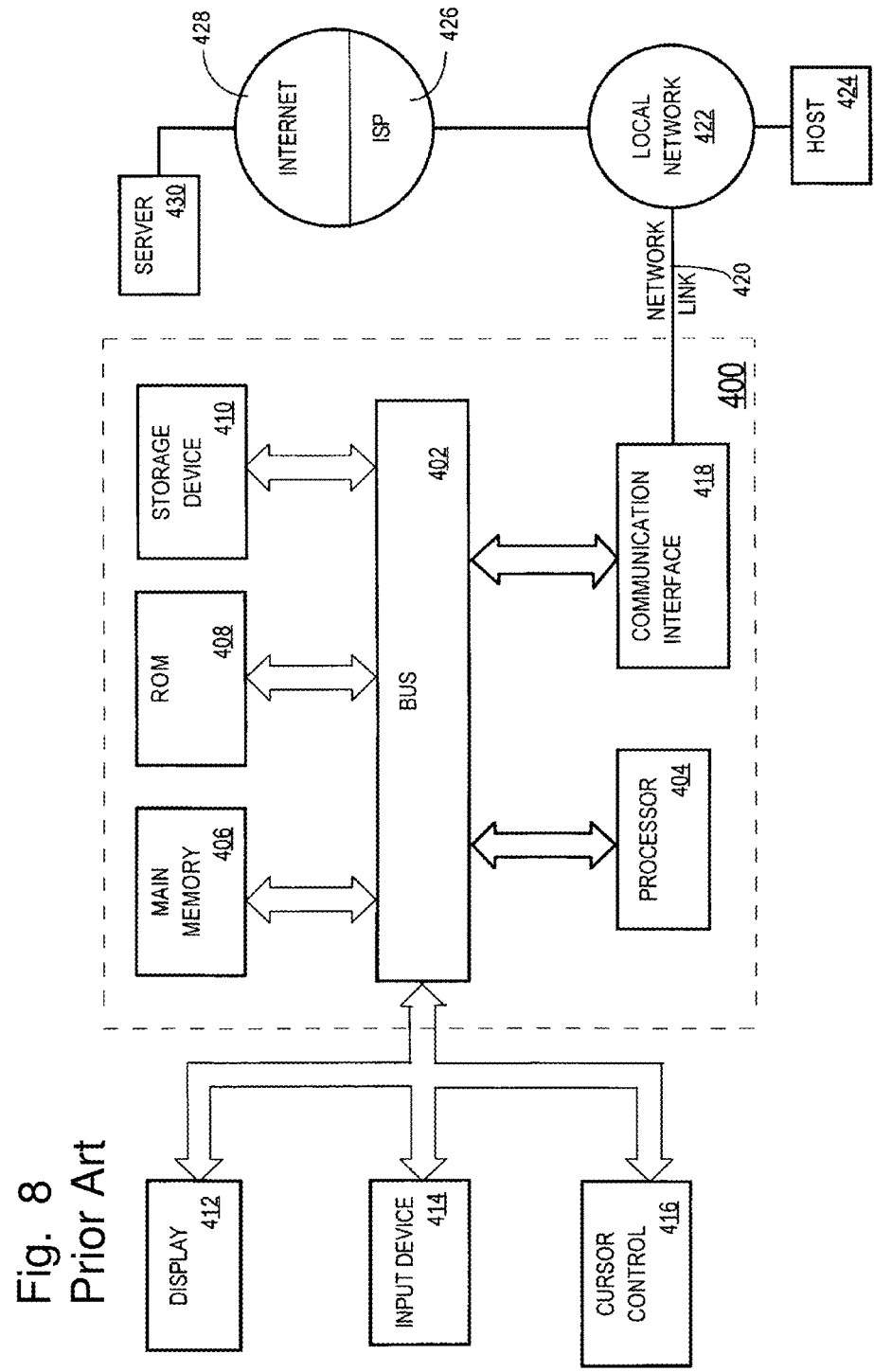
FIG. 8 represents a prior art hardware system.

FIG. 8 (see U.S. Pat. No. 7,702,660, issued to Chan, expressly incorporated herein by reference), shows a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

U.S. 2012/0173732, expressly incorporated herein by reference, discloses various embodiments of computer systems, the elements of which may be combined or subcombined according to the various permutations.

It is understood that this broad invention is not limited to the embodiments discussed herein, but rather is composed of the various combinations, subcombinations and permutations thereof of the elements disclosed herein, including aspects disclosed within the incorporated references. The invention is limited only by the following claims.

8. REFERENCES (Each of which is expressly incorporated herein by reference in its entirety)

1 Arindam Banerjee, Srujana Merugu, Inderjit S. Dhillon, Joydeep Ghosh, Clustering with Bregman Divergences, The Journal of Machine Learning Research, 6, p. 1705-1749, Dec. 1, 2005
2 Albert Bifet, Geoff Holmes, Bernhard Pfahringer, Richard Kirkby, Ricard Gavaldà, New ensemble methods for evolving data streams, Proceedings of the 15th ACM SIGKDD international conference on Knowledge discovery and data mining, Jun. 28-Jul. 1, 2009, Paris, France [doi>10.1145/1557019.1557041]
3 Yun Chi, Belle L. Tseng, Junichi Tatemura, Eigen-trend: trend analysis in the blogosphere based on singular value decompositions, Proceedings of the 15th ACM international conference on Information and knowledge management, Nov. 6-11, 2006, Arlington, Va., USA [doi>10.1145/1183614.1183628]
4 Chris Ding, Tao Li, Michael I. Jordan, Nonnegative Matrix Factorization for Combinatorial Optimization: Spectral Clustering, Graph Matching, and Clique Finding, Proceedings of the 2008 Eighth IEEE International Conference on Data Mining, p. 183-192, Dec. 15-19, 2008 [doi>10.1109/ICDM.2008.130]
5 Anton Dries, Ulrich Rückert, Adaptive concept drift detection, Statistical Analysis and Data Mining, v.2 n.5‐6, p. 311-327, December 2009 [doi>10.1002/sam.v2:5/6]
6 Rong Ge, Martin Ester, Byron J. Gao, Zengjian Hu, Binay Bhattacharya, Boaz Ben-Moshe, Joint cluster analysis of attribute data and relationship data: The connected k-center problem, algorithms and applications, ACM Transactions on Knowledge Discovery from Data (TKDD), v.2 n.2, p.1-35, July 2008 [doi>10.1145/1376815.1376816]
7 G. H. Golub and C. F. V. Loan. Matrix computation. The Johns Hopkins University Press, Baltimore and London, 1996.
8 G. Gordon. Generalized2 linear2 models. In NIPS, 2002.
9 Dan He, D. Stott Parker, Topic dynamics: an alternative model of bursts in streams of topics, Proceedings of the 16th ACM SIGKDD international conference on Knowledge discovery and data mining, Jul. 25-28, 2010, Washington, D.C., USA [doi>10.1145/1835804.1835862]
10 Shohei Hido, Tsuyoshi Ide, Hisashi Kashima, Harunobu Kubo, Hirofumi Matsuzawa, Unsupervised change analysis using supervised learning, Proceedings of the 12th Pacific-Asia conference on Advances in knowledge discovery and data mining, May 20-23, 2008, Osaka, Japan
11 Geoff Hulten, Laurie Spencer, Pedro Domingos, Mining time-changing data streams, Proceedings of the seventh ACM SIGKDD international conference on Knowledge discovery and data mining, p. 97-106, Aug. 26-29, 2001, San Francisco, Calif. [doi>10.1145/502512.502529]
12 Daniel Kifer, Shai Ben-David, Johannes Gehrke, Detecting change in data streams, Proceedings of the Thirtieth international conference on Very large data bases, p. 180-191, Aug. 31-Sep. 3, 2004, Toronto, Canada
13 Ralf Klinkenberg, Learning drifting concepts: Example selection vs. example weighting, Intelligent Data Analysis, v.8 n.3, p. 281-300, August 2004
14 K. Lang. people.csail.mit.edu/jrennie/20newsgroups/.
15 Ling Chen, Abhishek Roy, Event detection from flickr data through wavelet-based spatial analysis, Proceedings of the 18th ACM conference on Information and knowledge management, Nov. 2-6, 2009, Hong Kong, China [doi>10.1145/1645953.1646021]
16 D. Lee and H. Seung. Learning the parts of objects by non-negative matrix factorization. Nature, 401:788-791, 1999.
17 D. Lee and H. Seung. Algorithms for non-negative matrix factorization. In NIPS, pages 556-562, 2000.
18 Bo Long, Zhongfei (Mark) Zhang, Philip S. Yu, Co-clustering by block value decomposition, Proceedings of the eleventh ACM SIGKDD international conference on Knowledge discovery in data mining, Aug. 21-24, 2005, Chicago, Ill., USA [doi>10.1145/1081870.1081949]

19. Bo Long, Xiaoyun Wu, Zhongfei (Mark) Zhang, Philip S. Yu, Unsupervised learning on k-partite graphs, Proceedings of the 12th ACM SIGKDD international conference on Knowledge discovery and data mining, Aug. 20-23, 2006, Philadelphia, Pa., USA [doi>10.1145/1150402.1150439]
20. P. Miettinen. Matrix Decomposition Methods for Data Mining: Computational Complexity and Algorithms. Helsinki University Print, 2009.
21. Kyosuke Nishida, Koichiro Yamauchi, Detecting concept drift using statistical testing, Proceedings of the 10th international conference on Discovery science, Oct. 1-4, 2007, Sendai, Japan
22. D. Preston, P. Protopapas, and C. Brodley. Event discovery in time series. In SDM, pages 61-72, 2009.
23. G. Seber and A. Lee. Linear Regression Analysis. Wiley, 2003.
24. Ajit P. Singh, Geoffrey J. Gordon, A Unified View of Matrix Factorization Models, Proceedings of the European conference on Machine Learning and Knowledge Discovery in Databases—Part II, Sep. 15-19, 2008, Antwerp, Belgium [doi>10.1007/978-3-540-87481-2_24]
25. Xiuyao Song, Mingxi Wu, Christopher Jermaine, Sanjay Ranka, Statistical change detection for multi-dimensional data, Proceedings of the 13th ACM SIGKDD international conference on Knowledge discovery and data mining, Aug. 12-15, 2007, San Jose, Calif., USA [doi>10.1145/1281192.1281264]
26. A. Tsymbal. The problem of concept drift: Definitions and related work. Technical report, 2004.
27. Matthijs Leeuwen, Arno Siebes, StreamKrimp: Detecting Change in Data Streams, Proceedings of the 2008 European Conference on Machine Learning and Knowledge Discovery in Databases—Part I, Sep. 15-19, 2008, Antwerp, Belgium [doi>10.1007/978-3-540-87479-9_62]
28. V. N. Vapnik. Statistical Learning Theory. John Wiley & sons, 1998.
29. Jilles Vreeken, Matthijs van Leeuwen, Arno Siebes, Characterising the difference, Proceedings of the 13th ACM SIGKDD international conference on Knowledge discovery and data mining, Aug. 12-15, 2007, San Jose, Calif., USA [doi>10.1145/1281192.1281274]
30. Haixun Wang, Wei Fan, Philip S. Yu, Jiawei Han, Mining concept-drifting data streams using ensemble classifiers, Proceedings of the ninth ACM SIGKDD international conference on Knowledge discovery and data mining, Aug. 24-27, 2003, Washington, D.C. [doi>10.1145/956750.956778]
31. Peng Zhang, Xingquan Zhu, Yong Shi, Categorizing and mining concept drifting data streams, Proceedings of the 14th ACM SIGKDD international conference on Knowledge discovery and data mining, Aug. 24-27, 2008, Las Vegas, Nev., USA [doi>10.1145/1401890.1401987]
32. Yi Xu, Zhongfei Zhang, Philips Yu, and Bo Long. 2011. Pattern change discovery between high dimensional data sets. In Proceedings of the 20th ACM international conference on Information and knowledge management (CIKM '11), Bettina Berendt, Arjen de Vries, Wenfei Fan, Craig Macdonald, Iadh Ounis, and Ian Ruthven (Eds.). ACM, New York, N.Y., USA, 1097-1106. DOI=10.1145/2063576.2063735 doi.acm.org/10.1145/2063576.2063735
33. Tae-Kyun Kim, Arandjelovi, O., and Cipolla, R., "Learning over Sets using Boosted Manifold Principal Angles (BoMPA)," Department of Engineering, University of Cambridge, Cambridge, UK, In Proc. British Machine Vision Conference, 2: 779-788 (2005).
34. Wolf, L., and Shashua, A., "Learning over Sets using Kernel Principal Angles," Journal of Machine Learning Research 4, published October 2003, pp. 913-931, Copyright Lior Wolf and Amnon Shashua.
35. Absil, P. A., Edelman, A., & Koev, P. (2006). On the largest principal angle between random subspaces. Linear algebra and its applications, 414(1), 288-294.
36. Kate Okikiolu, "The multiplicative anomaly for determinants of elliptic operators", Duke Math. J. Volume 79, Number 3 (1995), 723-750.
37. Miao, J., & Ben-Israel, A. (1992). On principal angles between subspaces in Rn. Linear algebra and its applications, 171, 81-98.
38. Mortari, D. (2000). Second estimator of the optimal quaternion. Journal of Guidance Control and Dynamics, 23(5), 885-887.
39. Rheinboldt, Werner C. "On the computation of multidimensional solution manifolds of parametrized equations." Numerische Mathematik 53.1 (1988): 165-181.
40. Badeau, Roland, Bertrand David, and Gaël Richard. "Fast approximated power iteration subspace tracking." Signal Processing, IEEE Transactions on 53.8 (2005): 2931-2941.
41. Kim, Tae-Kyun, Ognjen Arandjelović, and Roberto Cipolla. "Boosted manifold principal angles for image set-based recognition." Pattern Recognition 40.9 (2007): 2475-2484.
42. Ash, Joshua N., and Randolph L. Moses. "On optimal anchor node placement in sensor localization by optimization of subspace principal angles." Acoustics, Speech and Signal Processing, 2008. ICASSP 2008. IEEE International Conference on. IEEE, 2008.
43. Burghelea, Dan, L. Friedlander, and T. Kappeler. "On the determination of elliptic differential and finite difference operators in vector bundles overS 1." Communications in Mathematical Physics 138.1 (1991): 1-18.
44. Burghelea, D., L. Friedlander, and T. Kappeler. "On the determinant of elliptic boundary value problems on a line segment." Proceedings of the American Mathematical Society 123.10 (1995): 3027-3038.
45. Silva, J., J. Marques, and J. Lemos. "Selecting landmark points for sparse manifold learning." Advances in neural information processing systems 18 (2006): 1241.
46. Tsiotras, Panagiotis, John L. Junkins, and Hanspeter Schaub. "Higher-order cayley transforms with applications to attitude representations." Journal of Guidance, Control, and Dynamics 20.3 (1997): 528-534.
47. Lesch, Matthias, and Jurgen Tolksdorf. "On the determinant of one-dimensional elliptic boundary value problems." Communications in mathematical physics 193.3 (1998): 643-660.
48. Huynh, Du Q., and Anders Heyden. "Outlier detection in video sequences under affine projection." Computer Vision and Pattern Recognition, 2001. CVPR 2001. Proceedings of the 2001 IEEE Computer Society Conference on. Vol. 1. IEEE, 2001.
19. Eisenstat, Stanley C., and I. C F Ipsen. "Relative perturbation results for eigenvalues and eigenvectors of diagonalisable matrices." BIT Numerical Mathematics 38.3 (1998): 502-509.
50. Drmač, Zlatko. "On relative residual bounds for the eigenvalues of a Hermitian matrix." Linear algebra and its applications 244 (1996): 155-163.
51. Hochwald, Bertrand M., and Wim Sweldens. "Differential unitary space-time modulation." Communications, IEEE Transactions on 48.12 (2000): 2041-2052.

52 Teixeira, André, et al. "Cyber security analysis of state estimators in electric power systems." Decision and Control (CDC), 2010 49th IEEE Conference on. IEEE, 2010.
53 Scott, Simon. "The residue determinant." Communications in Partial Differential Equations 30.4 (2005): 483-507.
54 Taulu, Samu, Juha Simola, and Matti Kajola. "Applications of the signal space separation method." Signal Processing, IEEE Transactions on 53.9 (2005): 3359-3372.
55 Gluck, Herman. "Higher curvatures of curves in Euclidean space, II." The American Mathematical Monthly 74.9 (1967): 1049-1056.
56 Gutmann, S., and L. Shepp. "Orthogonal bases for two subspaces with all mutual angles acute." Indiana University Mathematics Journal 27.1 (1978): 79-90.
57 Todorov, Emanuel, and Zoubin Ghahramani. "Analysis of the synergies underlying complex hand manipulation." Engineering in Medicine and Biology Society, 2004. IEMBS'04. 26th Annual International Conference of the IEEE. Vol. 2. IEEE, 2004.
58 Burghelea, Dan, L. Friedlander, and T. Kappeler. "Regularized determinants for pseudodifferential operators in vector bundles overS 1." Integral Equations and Operator Theory 16.4 (1993): 496-513.
59 Burghelea, Dan, L. Friedlander, and T. Kappeler. "On the determination of elliptic differential and finite difference operators in vector bundles overS 1." Communications in Mathematical Physics 138.1 (1991): 1-18.
60 Friedlander, Leonid. "Determinant of the Schrodinger Operator on a Metric Graph." Contemporary Mathematics 415 (2006): 151-160.
61 Park, Jinsung, and Krzysztof P. Wojciechowski. "Adiabatic decomposition of the ζ-determinant and Dirichlet to Neumann operator." Journal of Geometry and Physics 55.3 (2005): 241-266.
62 Wolf, L., and Amnon Shashua. "Kernel principal angles for classification machines with applications to image sequence interpretation." Computer Vision and Pattern Recognition, 2003. Proceedings. 2003 IEEE Computer Society Conference on. Vol. 1. IEEE, 2003.
63 Mosher, John C., and Richard M. Leahy. "Source localization using recursively applied and projected (RAP) MUSIC." Signal Processing, IEEE Transactions on 47.2 (1999): 332-340.
64 Absil, P. A., Ishteva, M., De Lathauwer, L., & Van Huffel, S. (2009). A geometric Newton method for Oja's vector field. Neural computation, 21(5), 1415-1433.
65 Boskovic, Dejan M., and Miroslav Krstic. "Global attitude/position regulation for underwater vehicles." International Journal of Systems Science 30.9 (1999): 939-946.
66 Elhamifar, Ehsan, and Rene Vidal. "Clustering disjoint subspaces via sparse representation." Acoustics Speech and Signal Processing (ICASSP), 2010 IEEE International Conference on. IEEE, 2010.
67 Scharf, Louis L., and Clifford T. Mullis. "Canonical coordinates and the geometry of inference, rate, and capacity." Signal Processing, IEEE Transactions on 48.3 (2000): 824-831.
68 Behrens, Richard T., and Louis L. Scharf. "Signal processing applications of oblique projection operators." Signal Processing, IEEE Transactions on 42.6 (1994): 1413-1424.
69 Shakhnarovich, Gregory, John Fisher, and Trevor Darrell. "Face recognition from long-term observations." Computer Vision—ECCV 2002 (2002): 851-865.
70 Hua, Yingbo, et al. "A new look at the power method for fast subspace tracking." Digital Signal Processing 9.4 (1999): 297-314.
71 Stewart, Gilbert W. "An updating algorithm for subspace tracking." Signal Processing, IEEE Transactions on 40.6 (1992): 1535-1541.
72 Verhaegen, M. H. "The use of the QR factorization in the partial realization problem." (1987).
73 Yang, A. Kavcicand B. "A New Efficient Subspace Tracking Algorithm Based On Singular Value Decomposition." Proceedings IEEE ICASSP. Vol. 94.
74 Champagne, Benoft. "Adaptive Subspace Tracking Using A Constrained Linearization Approach."
75 Champagne, Benoit. "SVD-updating via constrained perturbations with application to subspace tracking." Signals, Systems and Computers, 1996. Conference Record of the Thirtieth Asilomar Conference on. IEEE, 1996.
76 Champagne, Benoit, and Qing-Guang Liu. "Plane rotation-based EVD updating schemes for efficient subspace tracking." Signal Processing, IEEE Transactions on 46.7 (1998): 1886-1900.
77 Mattheij, R. M. M., and S. J. Wright. "Parallel algorithms for parameter identification in odes", Eindhoven University of Technology (1996).
78 Miao, Yongfeng, and Yingbo Hua. "Fast subspace tracking and neural network learning by a novel information criterion." Signal Processing, IEEE Transactions on 46.7 (1998): 1967-1979.
79 Badeau, Roland, et al. "Approximated power iterations for fast subspace tracking." Signal Processing and Its Applications, 2003. Proceedings. Seventh International Symposium on. Vol. 2. IEEE, 2003.
80 Mathew, G., Vellenki U. Reddy, and Soura Dasgupta. "Adaptive estimation of eigensubspace." Signal Processing, IEEE Transactions on 43.2 (1995): 401-411.
81 Luk, Franklin T. "A triangular processor array for computing the singular value decomposition." (1984).
82 Vanpoucke, Filiep, and Marc Moonen. "Parallel and stable spherical subspace tracking." Acoustics, Speech, and Signal Processing, 1995. ICASSP-95., 1995 International Conference on. Vol. 3. IEEE, 1995.
83 Ouyang, Shan, and Yingbo Hua. "Bi-iterative least-square method for subspace tracking." Signal Processing, IEEE Transactions on 53.8 (2005): 2984-2996.
84 Chandrasekaran, Shivkumar, and Ilse C F Ipsen. "Analysis of a QR algorithm for computing singular values." SIAM Journal on Matrix Analysis and Applications 16.2 (1995): 520-535.
85 Strobach, Peter. "Bi-iteration multiple invariance subspace tracking and adaptive ESPRIT." Signal Processing, IEEE Transactions on 48.2 (2000): 442-456.
86 Li, Xi, Kazuhiro Fukui, and Nanning Zheng. "Image-set based face recognition using boosted global and local principal angles." Computer Vision—ACCV 2009 (2010): 323-332.
87 Bissacco, Alessandro, et al. "Recognition of human gaits." Computer Vision and Pattern Recognition, 2001. CVPR 2001. Proceedings of the 2001 IEEE Computer Society Conference on. Vol. 2. IEEE, 2001.
88 Schaub, Hanspeter, Panagiotis Tsiotras, and John L. Junkins. "Principal rotation representations of proper*N*x*N* orthogonal matrices." International Journal of Engineering Science 33.15 (1995): 2277-2295.
89 Van Overschee, Peter, and Bart De Moor. "Subspace algorithms for the stochastic identification problem." Automatica 29.3 (1993): 649-660.

90 Bonde, Ujwal, Tae-Kyun Kim, and K. Ramakrishnan. "Randomised manifold forests for principal angle-based face recognition." Computer Vision—ACCV 2010 (2011): 228-242.

91 Wang, Tiesheng, and Pengfei Shi. "Kernel Grassmannian distances and discriminant analysis for face recognition from image sets." Pattern Recognition Letters 30.13 (2009): 1161-1165.

92 Beveridge, J. Ross, et al. "Principal angles separate subject illumination spaces in YDB and CMU-PIE." Pattern Analysis and Machine Intelligence, IEEE Transactions on 31.2 (2009): 351-363.

93 Harandi, Mehrtash T., et al. "Graph embedding discriminant analysis on Grassmannian manifolds for improved image set matching." Computer Vision and Pattern Recognition (CVPR), 2011 IEEE Conference on. IEEE, 2011.

94 Nishiyama, Masashi, et al. "Recognizing faces of moving people by hierarchical image-set matching." Computer Vision and Pattern Recognition, 2007. CVPR'07. IEEE Conference on. IEEE, 2007.

95 Cevikalp, Hakan, and Bill Triggs. "Face recognition based on image sets." Computer Vision and Pattern Recognition (CVPR), 2010 IEEE Conference on. IEEE, 2010.

96 Hamm, Jihun, and Daniel D. Lee. "Grassmann discriminant analysis: a unifying view on subspace-based learning." Proceedings of the 25th international conference on Machine learning. ACM, 2008.

97 Kim, Tae-Kyun, Josef Kittler, and Roberto Cipolla. "On-line learning of mutually orthogonal subspaces for face recognition by image sets." Image Processing, IEEE Transactions on 19.4 (2010): 1067-1074.

98 Hamm, Jihun, and Daniel D. Lee. "Extended Grassmann kernels for subspace-based learning." Neural Information Processing Systems (NIPS). 2009.

99 Li, Xi, Kazuhiro Fukui, and Nanning Zheng. "Boosting constrained mutual subspace method for robust image-set based object recognition." Proceedings of the 21st international joint conference on Artificial intelligence. Morgan Kaufmann Publishers Inc., 2009.

100 Fukui, Kazuhiro, and Osamu Yamaguchi. "The kernel orthogonal mutual subspace method and its application to 3D object recognition." Computer Vision—ACCV 2007 (2007): 467-476.

101 Hu, Yiqun, Ajmal S. Mian, and Robyn Owens. "Sparse approximated nearest points for image set classification." Computer Vision and Pattern Recognition (CVPR), 2011 IEEE Conference on. IEEE, 2011.

102 Kim, Tae-Kyun, Josef Kittler, and Roberto Cipolla. "Incremental learning of locally orthogonal subspaces for set-based object recognition." Proc. IAPR British Machine Vision Conf. 2006.

103 Arandjelović, Ognjen, and Roberto Cipolla. "A posewise linear illumination manifold model for face recognition using video." Computer vision and image understanding 113.1 (2009): 113-125.

104 Nishiyama, Masashi, Osamu Yamaguchi, and Kazuhiro Fukui. "Face recognition with the multiple constrained mutual subspace method." Audio- and Video-Based Biometric Person Authentication. Springer Berlin/Heidelberg, 2005.

105 Wang, Ruiping, et al. "Manifold-manifold distance with application to face recognition based on image set." Computer Vision and Pattern Recognition, 2008. CVPR 2008. IEEE Conference on. IEEE, 2008.

106 Chang, Jen-Mei, Michael Kirby, and Chris Peterson. "Set-to-set face recognition under variations in pose and illumination." Biometrics Symposium, 2007. IEEE, 2007.

107 Wang, Ruiping, and Xilin Chen. "Manifold discriminant analysis." Computer Vision and Pattern Recognition, 2009. CVPR 2009. IEEE Conference on. IEEE, 2009.

108 Lui, Yui Man, et al. "Image-set matching using a geodesic distance and cohort normalization." Automatic Face & Gesture Recognition, 2008. FG'08. 8th IEEE International Conference on. IEEE, 2008.

109 Kim, Tae-Kyun, Josef Kittler, and Roberto Cipolla. "Learning discriminative canonical correlations for object recognition with image sets." Computer Vision—ECCV 2006 (2006): 251-262.

110 Wang, Ruiping, et al. "Covariance discriminative learning: A natural and efficient approach to image set classification." Computer Vision and Pattern Recognition (CVPR), 2012 IEEE Conference on. IEEE, 2012.

111 Kawahara, Tomokazu, et al. "Face recognition based on whitening transformation of distribution of subspaces." Workshop on Asian Conference on Computer Vision, Subspace. 2007.

112 Kim, Tae-Kyun, Josef Kittler, and Roberto Cipolla. "Discriminative learning and recognition of image set classes using canonical correlations." Pattern Analysis and Machine Intelligence, IEEE Transactions on 29.6 (2007): 1005-1018.

113 Wolf, Lior, and Amnon Shashua. "Learning over sets using kernel principal angles." The Journal of Machine Learning Research 4 (2003): 913-931.

114 Conway, John H., Ronald H. Hardin, and Neil J A Sloane. "Packing lines, planes, etc.: Packings in Grassmannian spaces." Experimental Mathematics 5.2 (1996): 139-159.

115 Knyazev, Andrew V., and Merico E. Argentati. "Principal angles between subspaces in an A-based scalar product: algorithms and perturbation estimates." SIAM Journal on Scientific Computing 23.6 (2002): 2008-2040.

116 Drmac, Zlatko. "On principal angles between subspaces of Euclidean space." SIAM Journal on Matrix Analysis and Applications 22.1 (2000): 173-194.

117 Wesolkowski, Slawo, Robert D. Dony, and M. E. Jernigan. "Global color image segmentation strategies: Euclidean distance vs. vector angle." Neural Networks for Signal Processing IX, 1999. Proceedings of the 1999 IEEE Signal Processing Society Workshop. IEEE, 1999.

118 Wesolkowski, Slawomir Bogumil. Color image edge detection and segmentation: a comparison of the vector angle and the euclidean distance color similarity measures. Diss. University of Waterloo, 1999.

119 Dony, R. D., and S. Haykin. "Image segmentation using a mixture of principal components representation." IEE proceedings. Vision, image and signal processing 144.2 (1997): 73-80.

120 Wesolkowski, Slawo. "Clustering with a mixture of self-organizing maps." Neural Networks, 2002. IJCNN'02. Proceedings of the 2002 International Joint Conference on. Vol. 3. IEEE, 2002.

121 Chen, Wen-Sheng, et al. "Incremental nonnegative matrix factorization for face recognition." Mathematical Problems in Engineering 2008 (2008).

122 Teh, C-H., and Roland T. Chin. "On the detection of dominant points on digital curves." Pattern Analysis and Machine Intelligence, IEEE Transactions on 11.8 (1989): 859-872.

123 Chandrasekaran, Shivkumar, and Ilse C F Ipsen. "On the singular value decomposition of triangular matrices." xiong Jiang [xJ94]: 85-9.

124 Ding, Chris, et al. "R 1-PCA: rotational invariant L 1-norm principal component analysis for robust subspace factorization." Proceedings of the 23rd international conference on Machine learning. ACM, 2006.
125 Aggarwal, Gaurav, Amit K. Roy Chowdhury, and Rama Chellappa. "A system identification approach for video-based face recognition." Pattern Recognition, 2004. ICPR 2004. Proceedings of the 17th International Conference on. Vol. 4. IEEE, 2004.
126 Absil, P.-A., A. Edelman, and P. Koev. "On the largest principal angle between random subspaces." (2004) (Submitted to LAA).
127 Watkins, David S., and Ludwig Elsner. "Convergence of algorithms of decomposition type for the eigenvalue problem." Linear Algebra and Its Applications 143 (1991): 19-47.
128 De Cock, Katrien, and Bart De Moor. "Subspace angles between ARMA models." Systems & control letters 46.4 (2002): 265-270.
129 Badeau, Roland, Gaël Richard, and Bertrand David. "Fast and stable YAST algorithm for principal and minor subspace tracking." Signal Processing, IEEE Transactions on 56.8 (2008): 3437-3446.
130 Amir, Valizadeh, and Karimi Mahmood. "Fast subspace tracking algorithm based on the constrained projection approximation." EURASIP Journal on Advances in Signal Processing 2009 (2009).
131 Morton, Harold S., John L. Junkins, and Jeffrey N. Blanton. "Analytical solutions for Euler parameters." Celestial Mechanics and Dynamical Astronomy 10.3 (1974): 287-301.
132 Chang, Jen-Mei, et al. "Recognition of digital images of the human face at ultra low resolution via illumination spaces." Computer Vision—ACCV 2007 (2007): 733-743.
133 Zhao, Shi Jian, Yong Mao Xu, and J. Zhang. "A Multiple PCA Model based Technique for the Monitoring of Processes with Multiple Operating Modes."
134 Ye, Jieping. "Generalized low rank approximations of matrices." Machine Learning 61.1 (2005): 167-191.
135 Mortari, Daniele. "On the Rigid Rotation Conept in n-Dimensional Spaces." Journal of the Astronautical Sciences 49.3 (2001): 401-420.
136 I Bengtsson, W Bruzda, A Ericsson, J A Larsson, "Mutually unbiased bases and Hadamard matrices of order six", Journal of mathematical . . . , 2007-link.aip.org
137 C. H. Chien, J. K. Aggarwal, "A Normalized Quadtree Representation", TR-84-2-23 (February 1984), University of Texas.
137 GNU Octave Manual, section 18.3 (Matrix factorization) www.gnu.org/software/octave/; www.gnu.org/software/octave/doc/interpreter/Matrix-Factorizations.html.
138 Merico Edward Argentati; "Principal Angles Between Subspaces As Related To Rayleigh Quotient And Rayleigh Ritz Inequalities With Applications To Eigenvalue Accuracy And An Eigenvalue Solver", University of Colorado at Denver (Ph.D. Thesis 2003).
139 Roland Badeau, Bertrand David, Gaël Richard, "Yet Another Subspace Tracker", Telecom Paris—Département TSI (2005).
140 Peter Van Overschee, Bart De Moor, Subspace Identification For Linear Systems, Kluwer Academic Publishers (1996) (see, e.g., sect. 1.4.3).
141 Ilse Ipsen, "A Overview of relative sin θ, Theorems For Invariant Subspaces of Complex Matrices", www.ncsu.edu/crsc/reports/ftp/pdf/crsc-tr99-18.pdf (1999).
142 Haoran Yi, Deepu Raj an, Liang-Tien Chia, "A ZGPCA Algorithm For Subspace Estimation", ICME 2007.
143 Martin Haardt, Florian Roemer, Giovanni Del Galdo, "Higher-Order SVD-Based Subspace Estimation to Improve the Parameter Estimation Accuracy in Multidimensional Harmonic Retrieval Problems" IEEE Transactions On Signal Processing, Vol. 56, No. 7, July 2008.
144 Mandi Soltanolkotabi, Emmanuel J. Candes, "A Geometric Analysis of Subspace Clustering with Outliers", Department of Electrical Engineering, Stanford University (2012).
145 Andrew V. Knyazev, Merico E. Argentati, "Principal Angles Between Subspaces In An A-Based Scalar Product: Algorithms And Perturbation Estimates", SIAM J. Sci. Comput. Vol. 23, No. 6, pp. 2009-2041(2002).
146 Austin Adams And Amy Mulgrew, "Cats And Dogs: What's The Difference?", Department of Mathematics and Statistics, California State University, Long Beach (2010).
147 A. Hot, G. Kerschen, E. Foltete, S. Cogan, "Detection and quantification of non-linear structural behavior using principal component analysis", Mechanical Systems and Signal Processing 26:104-116 (2012).
148 Rene Vidal, "A Tutorial On Subspace Clustering", Johns Hopkins University, IEEE Signal Processing Magazine, (2010).
149 Xiaotong Yuan, "Low-Rank Representation with Positive SemiDefinite Constraint (LRR-PSD)—A Robust Approach for Subspace Segmentation", www.columbia.edu/~js4038/docs/LRRPSD.pdf (2010).
150 W. Zhao, R. J. Allemang, "A Low Order Frequency Domain Approach for Structural Damage Detection" sem-proceedings.com/sem.org-IMAC-XXVI-Confs24p02-A-Low-Order-Frequency-Domain-Approach-Structural-Damage-Detection.pdf
151 A. K. Motovilov, "Comment on 'The tan θ theorem with relaxed conditions', by Y. Nakatsukasa" arxiv.org/abs/1204.4441v1 (2012).
152 E. T. Janeys. Probability Theory: The logic of science. Chapter 13. Unpublished manuscript. 1996.
153 C. Diana Nicoll, Michael Pignone, Chuanyi Mark Lu. Current Medical Diagnosis & Treatment 2013 Chapter e3. The McGraw-Hill Companies. 2012.
154 David Breitgand, Ealan Henis, Onn Shehory. Automated and Adaptive Threshold Setting: Enabling Technology for Autonomy and Self-Management. Proceedings of the Second International Conference on Autonomic Computing (ICAC'05).
155 T. Romen Singh, Sudipta Roy, O. Imocha Singh, Tejmani Sinam, Kh. Manglem Singh. A New Local Adaptive Thresholding Technique in Binarization. IJCSI International Journal of Computer Science Issues, Vol. 8, Issue 6, No 2, (2011) 271-277.
156 Feixiang Yan, Hong Zhang, C. Ronald Kube. A multistage adaptive thresholding method. Pattern Recognition Letters 26 (2005) 1183-1191.
157 Xiaoyi Jiang. Adaptive local thresholding by verification-based multithreshold probing with application to vessel detection in retinal images. Pattern Analysis and Machine Intelligence, IEEE Transactions on. Vol. 25, Issue 1 (2003)131-137.

What is claimed is:

1. A method for discovering or ranking a change in a pattern of high-dimensional data, comprising:
determining a matrix representing a linear model of a dominant subspace for the high dimensional data;
iteratively optimizing a factorization of the matrix into an estimated feature basis matrix and an estimated indicator matrix corresponding to a set of principal angles representing the change in the pattern of the high dimensional data, with at least one automated processor;

determining a statistical likelihood ratio with respect to alternate hypotheses regarding a statistical significance of the change in the pattern of the high dimensional data based on sets of basis vectors determined dependent on the set of principal angles from the optimized factorization of the matrix;

based on at least the statistical likelihood ratios, predicting the significant change represented in the high-dimensional data with the at least one automated processor according to an adaptive criterion;

at least one of:
ranking the respective high dimensional data; and
determining a statistically significant difference of respective high dimensional data; and
altering the adaptive criterion with the at least one automated processor dependent on the ranking or determined statistically significant difference.

2. The method according to claim 1, wherein the high dimensional data represents at least one of:
respective time-periods for a corresponding data source;
multimedia data;
video data;
image data;
text data;
semantic data;
social network data;
transaction data;
market data;
news data; and
genomic data.

3. The method according to claim 1, wherein the change in the pattern of high dimensional data represents changes of a common object represented in high dimensional data comprising video, and common object moves within the video.

4. The method according to claim 1, wherein statistical likelihood ratio represents a likelihood ratio statistic:

$$\Lambda = \frac{\|X - \hat{P}\hat{S}^T\|^2}{\|X - \hat{P}_H\hat{S}_H^T\|^2},$$

wherein $\hat{P}$ and $\hat{S}$ represent estimates of $P_{m \times k}$ and $S_{n \times k}$ which are lower dimension factors whose product approximates the high dimensional data set matrix $X_{m \times n}$, k<<min(m,n), and $\hat{P}_H$ and $\hat{S}_H$ represent estimates of the feature basis matrix $P_H$ and the indicator matrix $S_H$, further comprising determining the statistically significant change in the pattern of differences based on an increased value of the likelihood ratio statistic.

5. The method according to claim 1, wherein the high dimensional data represents a stream of data over time.

6. The method according to claim 5, wherein the statistical likelihood ratio is used to determine presence of a statistically significant difference in the stream of data at different times.

7. The method according to claim 1, wherein high-dimensional data comprises a time series of customer transaction data, and the statistically significant difference represents changes over time in a pattern of customer transactions, further comprising determining at least one customer interest from the pattern of differences.

8. The method according to claim 1, wherein the high-dimensional data comprises a first data set comprising equity market data and news feed, and second data set comprising a high dimensional model of historical performance of equity markets with respect to the news feed, wherein the statistically significant difference of respective high dimensional data predicts whether a significant change in market trajectory is about to occur.

9. The method according to claim 1, wherein the statistical likelihood ratio employs a likelihood ratio statistic given by:

$$\Lambda = \frac{\|X - \hat{P}\hat{S}^T\|^2}{\|X - \hat{P}_H\hat{S}_H^T\|^2}$$

based on $\hat{P}$, $\hat{S}$ and $\hat{P}_H$, $\hat{S}_H$, wherein $\hat{P}$ and $\hat{S}$ represent estimates of $P_{m \times k}$ and $S_{n \times k}$ which are lower dimension factors whose product approximates the high dimensional data set matrix $X_{m \times n}$, k<<min(m,n), and $\hat{P}_H$ and $\hat{S}_H$ represent estimates of the feature basis matrix $P_H$ and the indicator matrix $S_H$, the statistical likelihood ratio being employed in a likelihood ratio test performed by:
estimating P only based on the linear model G with additive Gaussian noise, and then estimating P under constraint $H_0$: $P'^T P = 0$, and
computing a likelihood ratio between the two cases, wherein on the linear model G: $X = PS^T + \varepsilon$, where $\varepsilon \cdot j \sim N_{m \times 1}(0, \sigma_2 I_{m \times m})$, the likelihood function for G is $$L(P, S) = (2\pi\sigma^2)^{-mn} \exp\left[-\frac{1}{2\sigma^2}\|X - PS^T\|^2\right].$$

10. The method according to claim 9, further comprising finding maximum likelihood estimates $$\mathcal{L}(P, S) =$$
$$-\log L(P, S) + \lambda\|P^T P'\|^2 = \text{constant} + \frac{np}{2} + \frac{1}{2\sigma^2}\|X - PS^T\|^2 + \lambda\|P^T P'\|^2$$

subject to the null hypothesis constraint $H_0$: $P'^T P = 0$, by iteratively minimizing $\mathcal{L}(P,S) = \|X - PS^T\|^2 + \lambda\|P^T P'\|^2$, wherein $$\lambda = \frac{1}{mk} \sum_{i,j} \frac{(XS - PS^T S)_{ij}}{(P'P'^T P)_{ij}}.$$

11. A system for discovering or ranking a change in a pattern of high-dimensional data, comprising:
an input port configured to receive the high dimensional data;
at least one automated processor, configured to:
determine a matrix representing a linear model of a dominant subspace for the high dimensional data;
iteratively optimize a factorization of the matrix into an estimated feature basis matrix and an estimated indicator matrix corresponding to a set of principal angles representing the change in the pattern of the high dimensional data;

determine a statistical likelihood ratio with respect to alternate hypotheses regarding a statistical significance of the change in the pattern of the high dimensional data based on sets of basis vectors determined dependent on the set of principal angles from the optimized factorization of the matrix;

based on at least the statistical likelihood ratios, predict the significant change represented in the high-dimensional data according to an adaptive criterion;

at least one of:
rank the respective high dimensional data; and
determine a statistically significant difference of respective high dimensional data; and
alter the adaptive criterion dependent on the ranking or determined statistically significant difference; and an output port configured to selectively present a signal dependent on the rank or statistically significant difference.

12. The system according to claim 11, wherein statistical likelihood ratio represents a likelihood ratio statistic:

$$\Lambda = \frac{\|X - \hat{P}\hat{S}^T\|^2}{\|X - \hat{P}_H\hat{S}_H^T\|^2},$$

wherein $\hat{P}$ and $\hat{S}$ represent estimates of $P_{m \times k}$ and $S_{n \times k}$ which are lower dimension factors whose product approximates the high dimensional data set matrix $X_{m \times n}$, $k \ll \min(m,n)$, and $\hat{P}_H$ and $\hat{S}_H$ represent estimates of the feature basis matrix $P_H$ and the indicator matrix $S_H$, wherein the at least one automated processor is further configured to determine the statistically significant change in the pattern of differences based on an increased value of the likelihood ratio statistic.

13. The system according to claim 11, wherein the high dimensional data represents a stream of data over time.

14. The system according to claim 13, wherein the at least one automated processor is further configured to use the statistical likelihood ratio to determine presence of a statistically significant difference in the stream of data at different times.

15. The system according to claim 11, wherein high-dimensional data comprises a time series of customer transaction data, and the statistically significant difference represents changes over time in a pattern of customer transactions, wherein the at least one automated processor is further configured to determine at least one customer interest from the pattern of differences.

16. The system according to claim 11, wherein the high-dimensional data comprises a first data set comprising equity market data and news feed, and second data set comprising a high dimensional model of historical performance of equity markets with respect to the news feed, wherein the at least one automated processor is further configured to employ the statistically significant difference of respective high dimensional data to predict whether a significant change in market trajectory is about to occur.

17. The system according to claim 11, wherein the statistical likelihood ratio employs a likelihood ratio statistic given by:

$$\Lambda = \frac{\|X - \hat{P}\hat{S}^T\|^2}{\|X - \hat{P}_H\hat{S}_H^T\|^2}$$

based on $\hat{P}$, $\hat{S}$ and $\hat{P}_H$, $\hat{S}_H$, wherein $\hat{P}$ and $\hat{S}$ represent estimates of $P_{m \times k}$ and $S_{n \times k}$ which are lower dimension factors whose product approximates the high dimensional data set matrix $X_{m \times n}$, $k \ll \min(m,n)$, and $\hat{P}_H$ and $\hat{S}_H$ represent estimates of the feature basis matrix $P_H$ and the indicator matrix $S_H$, the at least one automated processor being further configured to employ the statistical likelihood ratio in a likelihood ratio test performed by:
estimating P only based on the linear model G with additive Gaussian noise, and then estimating P under constraint $H_0$: $P'^T P = 0$, and
computing a likelihood ratio between the two cases, wherein on the linear model G: $X = PST + \varepsilon$, where $\varepsilon_{\cdot j} \sim N_{m \times 1}(0, \sigma_2 I_{m \times m})$, the likelihood function for G is $$L(P, S) = (2\pi\sigma^2)^{-mn} \exp\left[-\frac{1}{2\sigma^2}\|X - PS^T\|^2\right].$$

18. The system according to claim 17, wherein the at least one automated processor is further configured to find maximum likelihood estimates $$\mathcal{L}(P, S) =$$

$$-\log L(P, S) + \lambda \|P^T P'\|^2 = \text{constant} + \frac{np}{2} + \frac{1}{2\sigma^2}\|X - PS^T\|^2 + \lambda \|P^T P'\|^2$$

subject to the null hypothesis constraint $H_0$: $P'^T P = 0$,
by iteratively minimizing $\mathcal{L}(P,S) = \|X - PS^T\|^2 + \lambda \|P^T P'\|^2$, wherein $$\lambda = \frac{1}{mk} \sum_{ij} \frac{(XS - PS^T S)_{ij}}{(P' P'^T P)_{ij}}.$$

19. A non-transitory computer readable medium storing therein instructions for controlling a programmable processor to discover or rank a change in a pattern of high-dimensional data, comprising:

instructions for determining a matrix representing a linear model of a dominant subspace for the high dimensional data;

instructions for iteratively optimizing a factorization of the matrix into an estimated feature basis matrix and an estimated indicator matrix corresponding to a set of principal angles representing the change in the pattern of the high dimensional data, with at least one automated processor;

instructions for determining a statistical likelihood ratio with respect to alternate hypotheses regarding a statistical significance of the change in the pattern of the high dimensional data based on sets of basis vectors determined dependent on the set of principal angles from the optimized factorization of the matrix;

instructions for, based on at least the statistical likelihood ratios, predicting the significant change represented in the high-dimensional data according to an adaptive criterion at least one of:

ranking the respective high dimensional data; and determining a statistically significant difference of respective high dimensional data; and instructions for altering the adaptive criterion dependent on the ranking or determined statistically significant difference.

20. The non-transitory computer readable medium according to claim 19, wherein statistical likelihood ratio represents a likelihood ratio statistic:

$$\Lambda = \frac{\|X - \hat{P}\hat{S}^T\|^2}{\|X - \hat{P}_H \hat{S}_H^T\|^2},$$

wherein P and S represent estimates of $P_{m \times k}$ and $S_{n \times k}$ which are lower dimension factors whose product approximates the high dimensional data set matrix $X_{m \times n}$, k<<min(m,n), and $\hat{P}_H$ and $\hat{S}_H$ represent estimates of the feature basis matrix $P_H$ and the indicator matrix $S_H$.

* * * * *